United States Patent
Ando et al.

(10) Patent No.: US 9,012,089 B2
(45) Date of Patent: Apr. 21, 2015

(54) ELECTRIC STORAGE DEVICE

(75) Inventors: Nobuo Ando, Tokyo (JP); Kenji Kojima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1443 days.

(21) Appl. No.: 12/168,253

(22) Filed: Jul. 7, 2008

(65) Prior Publication Data

US 2009/0029257 A1    Jan. 29, 2009

(30) Foreign Application Priority Data

Jul. 17, 2007    (JP) ................................. 2007-185527

(51) Int. Cl.

| | |
|---|---|
| *H01M 4/00* | (2006.01) |
| *H01M 4/131* | (2010.01) |
| *H01G 9/008* | (2006.01) |
| *H01G 9/04* | (2006.01) |
| *H01G 11/06* | (2013.01) |
| *H01G 11/12* | (2013.01) |
| *H01G 11/38* | (2013.01) |

(Continued)

(52) U.S. Cl.
CPC .............. *H01M 4/131* (2013.01); *H01G 9/016* (2013.01); *H01G 9/058* (2013.01); *H01G 11/06* (2013.01); *H01G 11/12* (2013.01); *H01G 11/38* (2013.01); *H01G 11/46* (2013.01); *H01G 11/50* (2013.01); *H01G 11/70* (2013.01); *H01M 4/133* (2013.01); *H01M 4/137* (2013.01); *H01M 4/485* (2013.01); *H01M 4/587* (2013.01); *H01M 4/606* (2013.01); *H01M 4/72* (2013.01); *H01M 4/742* (2013.01); *H01M 10/044* (2013.01); *H01M 10/052* (2013.01); *H01M 10/0525* (2013.01); *H01M 10/0585* (2013.01); *H01M 10/0587* (2013.01); *H01M 12/005* (2013.01); *H01M 10/0564* (2013.01); *H01M 2004/028* (2013.01); *Y02E 60/122* (2013.01); *Y02T 10/7011* (2013.01); *Y02T 10/7022* (2013.01); *Y02E 60/13* (2013.01)

(58) Field of Classification Search
USPC ..................................................... 429/231.95
See application file for complete search history.

(56) References Cited

U.S. PATENT DOCUMENTS

| | | | |
|---|---|---|---|
| 2003/0134188 A1* | 7/2003 | Roy et al. ....................... 429/128 |
| 2005/0153173 A1 | 7/2005 | Kumashiro et al. | |
| 2007/0002524 A1* | 1/2007 | Ando et al. ................... 361/503 |

FOREIGN PATENT DOCUMENTS

| | | | |
|---|---|---|---|
| EP | 1014466 | * | 6/2000 |
| JP | 11-135105 | * | 5/1999 |

(Continued)

*Primary Examiner* — Jonathan Jelsma
*Assistant Examiner* — Rashid Alam
(74) *Attorney, Agent, or Firm* — McDermott Will & Emery LLP

(57) ABSTRACT

A positive electrode system of an electric storage device includes first and second positive electrodes. The first and second positive electrodes include current collectors, and first and second positive-electrode mixture layers, respectively. The negative electrode system of the electric storage device has a negative electrode including a current collector and a negative-electrode mixture layer. The first positive electrode and the second positive electrode are arranged across the negative electrode. The first positive-electrode mixture layer and the second positive-electrode mixture layer are connected to each other, and of different types. Through-holes are formed in the current collector of the negative electrode arranged between the first positive-electrode mixture layer and the second positive-electrode mixture layer.

9 Claims, 11 Drawing Sheets

(51) Int. Cl.

| | | |
|---|---|---|
| *H01G 11/46* | (2013.01) | |
| *H01G 11/50* | (2013.01) | |
| *H01G 11/70* | (2013.01) | |
| *H01M 4/133* | (2010.01) | |
| *H01M 4/137* | (2010.01) | |
| *H01M 4/485* | (2010.01) | |
| *H01M 4/587* | (2010.01) | |
| *H01M 4/60* | (2006.01) | |
| *H01M 4/72* | (2006.01) | |
| *H01M 4/74* | (2006.01) | |
| *H01M 10/04* | (2006.01) | |
| *H01M 10/052* | (2010.01) | |
| *H01M 10/0525* | (2010.01) | |
| *H01M 10/0585* | (2010.01) | |
| *H01M 10/0587* | (2010.01) | |
| *H01M 12/00* | (2006.01) | |
| *H01M 10/0564* | (2010.01) | |
| *H01M 4/02* | (2006.01) | |

(56) References Cited

FOREIGN PATENT DOCUMENTS

| | | |
|---|---|---|
| JP | 2000-36325 A | 2/2000 |
| JP | 2001-351688 A | 12/2001 |
| JP | 2005-203131 A | 7/2005 |
| WO | 02/41420 | 5/2002 |

\* cited by examiner

FIG. 11

|  | Cell capacitance (mAh) at 100 mA discharge | Energy density (Wh/l) | Cell capacitance (mAh) at 20 A discharge |
|---|---|---|---|
| Example 1 | 325 | 64 | 84 |
| Example 2 | 332 | 65 | 81 |
| Example 3 | 133 | 28 | 27 |
| Comparative example 1 | 532 | 109 | 32 |
| Comparative example 2 | 114 | 19 | 97 |
| Comparative example 3 | 328 | 64 | 68 |
| Comparative example 4 | 322 | 63 | 65 |

FIG. 12

|  | Cell capacitance (mAh) at 20 A discharge after 10 cycles | Cell capacitance (mAh) at 20 A discharge after 50 cycles |
|---|---|---|
| Example 1 | 84 | 79 |
| Example 3 | 27 | 24 |
| Comparative example 3 | 68 | 39 |
| Comparative example 4 | 65 | 35 |

ELECTRIC STORAGE DEVICE

CROSS-REFERENCE TO RELATED APPLICATIONS

The disclosure of Japanese Patent Application No. 2007-185527 filed on Jul. 17, 2007 including the specification, drawing and abstract is incorporated herein by reference in its entirety.

BACKGROUND OF THE INVENTION

1. Field of the Invention

The present invention relates to a technology that is well adaptable to an electric storage device including plural positive-electrode mixture layers of different types.

2. Description of the Related Arts

A high energy density and high output density are demanded to an electric storage device that is mounted to an electric vehicle, hybrid vehicle, or the like, or to an electric storage device installed into various power tools. Therefore, a lithium ion secondary battery, an electric double layer capacitor, etc. have been nominated as a candidate for the electric storage device. However, the lithium ion secondary battery has a high energy density, but low output density. The electric double layer capacitor has a high output density, but low energy density.

In view of this, there has been proposed an electric storage device called a hybrid capacitor in which the electric storage principles of the lithium ion secondary battery and the electric double layer capacitor are combined in order to achieve both of the satisfactory energy density and the satisfactory output density. The hybrid capacitor employs an activated carbon, which is used for the electric double layer capacitor, for a positive electrode so as to accumulate charges by utilizing the electric double layer in the positive electrode, and employs a carbon material, which is used for a lithium ion secondary battery, for a negative electrode, and lithium ions are doped into the carbon material of the negative electrode so as to accumulate charges. The application of the electric storage mechanism described above makes it possible to enhance the output density and the energy density. However, a further improvement in the output density and the energy density has been demanded in order to use the electric storage mechanism described above for a vehicle power source or a power source for a power tool.

Methods for enhancing an output density of a battery having a high energy density include the one in which an internal resistance is reduced by coating an electrode mixture material to be thin or by increasing an electrode area, and the one in which a battery and a capacitor are connected in parallel in order to supply great electric current from the capacitor. However, in the former method, the electrode mixture material is coated to be thin, which entails a reduction in the energy density of the electric storage device, or which makes the assembly difficult to thereby increase cost of the electric storage device. In the latter method, the battery and the capacitor are combined, which entails a reduction in the energy density of the whole electric storage device, or which entails increased cost of the electric storage device due to a complicated control circuit.

In order to solve these problems, there has been proposed an electric storage device in which positive-electrode current collectors of a lithium ion secondary battery and an electric double layer capacitor are connected to each other, and negative-electrode current collectors of the lithium ion secondary battery and the electric double layer capacitor are connected to each other (e.g., see Japanese Patent Application Laid-Open No. 2001-351688). Further, an electric storage device has been proposed in which a mixture material including an activated carbon or the like and a mixture material including a lithium cobalt oxide or the like are coated on a single current collector in a overlapping manner (e.g., see Japanese Patent Application Laid-Open No. 2000-36325 and Japanese Patent Application Laid-Open No. 2005-203131), or an electric storage device has been proposed in which a mixture material having mixed therein an activated carbon and a lithium cobalt oxide is coated on a single current collector (e.g., see International Publication WO 2002/41420).

However, in the electric storage device disclosed in Japanese Patent Application Laid-Open No. 2001-351688, it is difficult to cancel the difference in the potential between the electrodes that are connected to each other. Therefore, over discharge or overcharge of the lithium ion secondary battery or the electric double layer capacitor may occur. The occurrence of the over discharge or overcharge described above causes the deterioration in durability of the electric storage device. In the electric storage devices disclosed in Japanese Patent Application Laid-Open No. 2000-36325, Japanese Patent Application Laid-Open No. 2005-203131, and International Publication WO 2002/41420, it is difficult to secure the output density by sufficiently reducing the internal resistance. Further, the electric storage devices have a structure in which the lithium cobalt oxide is in contact with the activated carbon. Therefore, the affect caused by the deteriorated lithium cobalt oxide also affects the activated carbon, which deteriorates the durability of the electric storage device.

SUMMARY OF THE INVENTION

An object of the present invention is to enhance an energy density and an output density without deteriorating durability of an electric storage device.

An electric storage device according to the present invention has a positive electrode system including a positive electrode having a current collector and a positive-electrode mixture layer, and a negative electrode system including a negative electrode having a current collector and a negative-electrode mixture layer, wherein the positive electrode system includes a first positive-electrode mixture layer and a second positive-electrode mixture layer, which are connected to each other and which are of different types, and a through-hole is formed on the current collector arranged between the first positive-electrode mixture layer and the second positive-electrode mixture layer.

In the electric storage device according to the present invention, the first positive-electrode mixture layer and the second positive-electrode mixture layer are electrically connected to each other for transferring ions between the first positive-electrode mixture layer and the second positive-electrode mixture layer via the through-hole.

In the electric storage device according to the present invention, the first positive-electrode mixture layer and the second positive-electrode mixture layer are made of different materials.

In the electric storage device according to the present invention, the first positive-electrode mixture layer includes a transition metal oxide, and the second positive-electrode mixture layer includes an activated carbon.

In the electric storage device according to the present invention, the positive electrode system includes a first positive electrode and a second positive electrode, both being arranged across the negative electrode, wherein the through-hole is formed on the current collector of the negative electrode arranged between the first positive-electrode mixture layer of the first positive electrode and the second positive-electrode mixture layer of the second positive electrode.

In the electric storage device according to the present invention, the negative electrode system includes a first negative electrode and a second negative electrode, both being arranged across the positive electrode, wherein the though-hole is formed on the current collector of the positive electrode having the first positive-electrode mixture layer on its one surface and the second positive-electrode mixture layer on its other surface.

In the electric storage device according to the present invention, the first positive electrode having the first positive-electrode mixture layer, among the plural positive electrodes constituting the positive electrode system, is arranged at the outermost portion of the positive electrode system.

The electric storage device according to the present invention has a lithium ion source that is in contact with at least either one of the negative electrode and the positive electrode, wherein lithium ions are doped from the lithium ion source into at least either one of the negative electrode and the positive electrode.

In the electric storage device according to the present invention, the negative electrode has an electrode area greater than that of the positive electrode.

The electric storage device according to the present invention has a device structure of a laminate type in which the positive electrode and the negative electrode are alternately laminated, or a device structure of a wound type in which the positive electrode and the negative electrode are laminated and wound.

In the electric storage device according to the present invention, the negative-electrode mixture layer contains a polyacene-based organic semiconductor, which is a heat-treated material of an aromatic condensation polymer and has a polyacene skeletal structure in which a ratio of a number of hydrogen atoms to a number of carbon atoms is 0.05 or more and 0.50 or less, a graphite, or non-graphitizable carbon.

According to the present invention, since the through-hole is formed on the current collector arranged between the first positive-electrode mixture layer and the second positive-electrode mixture layer, which are connected to each other, ions can be transferred between the first positive-electrode mixture layer and the second positive-electrode mixture layer. Accordingly, the potential of the first positive-electrode mixture layer and the potential of the second positive-electrode mixture layer can be agreed to each other. Consequently, the first positive-electrode mixture layer and the second positive-electrode mixture layer, which are made of different materials, can be combined without deteriorating durability of the electric storage device, and hence, the energy density and the output density can be enhanced.

BRIEF DESCRIPTION OF THE DRAWINGS

FIG. 11 is a table showing a result of an evaluation of a cell capacitance; and

FIG. 12 is a table showing a result of an evaluation of a cell capacitance.

DETAILED DESCRIPTION OF THE PREFERRED EMBODIMENTS

Figure 1:
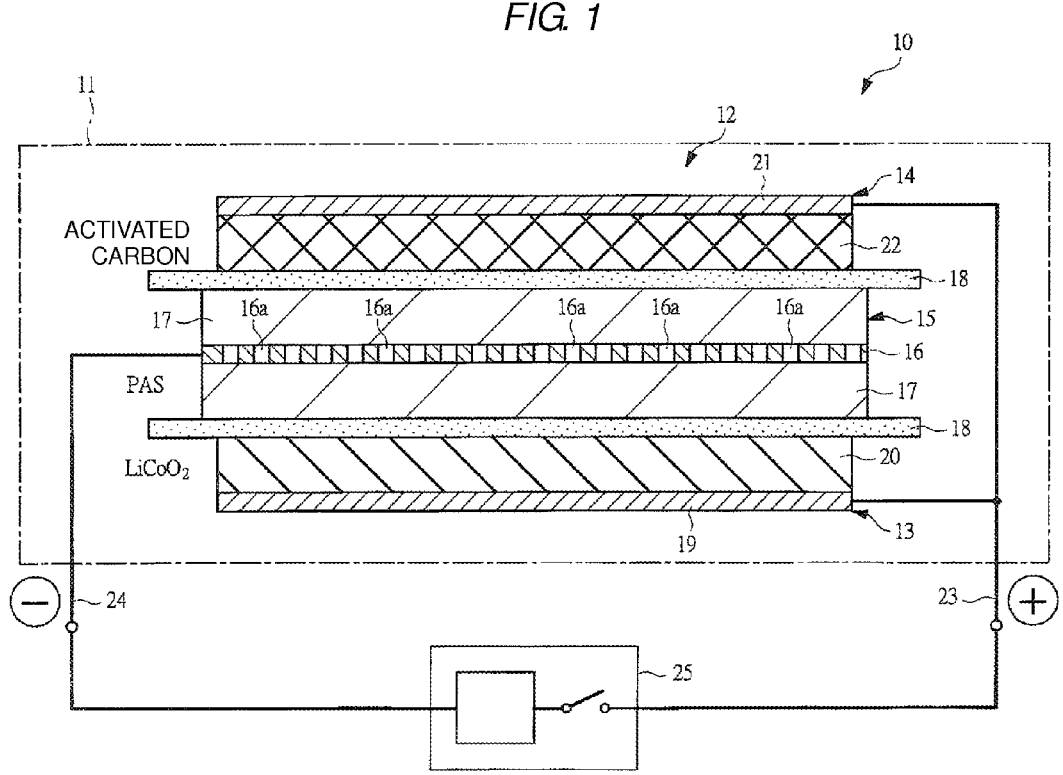
FIG. 1 is a sectional view schematically showing an internal structure of an electric storage device according to one embodiment of the present invention.

FIG. 1 is a sectional view schematically showing an internal structure of an electric storage device 10 according to one embodiment of the present invention. As shown in FIG. 1, an electrode laminate unit 12 is arranged at the inside of a laminate film 11 constituting an outer casing of the electric storage device 10. The electrode laminate unit 12 includes a positive electrode system having two positive electrodes 13 and 14, and a negative electrode system having a single negative electrode 15. An electrolyte made of aprotic organic solvent containing a lithium salt is injected into the laminate film 11 that is sealed by a thermal welding.

The negative electrode 15 arranged at the center of the electrode laminate unit 12 has a negative-electrode current collector (current collector) 16 provided with a large number of through-holes 16a, and negative-electrode mixture layers 17 coated on both surfaces of the negative-electrode current collector 16. A first positive electrode 13 and a second positive electrode 14 are arranged with separators 18 therebetween so as to sandwich the negative electrode 15. The positive electrode 13 includes a positive-electrode current collector (current collector) 19 and a first positive-electrode mixture layer 20, while the other positive electrode 14 includes a positive-electrode current collector (current collector) 21 and a second positive-electrode mixture layer 22. A positive electrode terminal 23 is connected to the pair of positive-electrode current collectors 19 and 21 that are connected to each other, while a negative electrode terminal 24 is connected to the negative-electrode current collector 16. A load circuit 25 that utilizes the electric storage device 10 as a power source is connected to the positive electrode terminal 23 and the negative electrode terminal 24. Specifically, in the illustrated electric storage device 10, an electric storage component including the positive-electrode mixture layer 20 and the negative-electrode mixture layer 17 opposite to the positive-electrode mixture layer 20 and an electric storage component including the positive-electrode mixture layer 22 and the negative-electrode mixture layer 17 opposite to the positive-electrode mixture layer 22 are connected in parallel.

The positive-electrode mixture layer 20 of the positive electrode 13 contains a lithium cobalt oxide ($LiCoO_2$), which is a transition metal oxide, as a positive-electrode active material that allows lithium ions to be reversibly doped thereinto and de-doped therefrom (hereinafter referred to as dope and de-dope), while the positive-electrode mixture layer 22 of the positive electrode 14 contains an activated carbon as a positive-electrode active material that allows lithium ions or anions to be reversibly doped thereinto and de-doped therefrom. The lithium cobalt oxide contained in the positive-electrode mixture layer 20 has high capacitance characteristic, and the activated carbon contained in the positive-electrode mixture layer 22 has high output characteristics. The negative-electrode mixture layer 17 of the negative electrode 15 contains a polyacene-based organic semiconductor (PAS) as a negative-electrode active material that allows lithium ions to be reversibly doped thereinto and de-doped therefrom. Lithium ions are doped beforehand into the negative electrode 15 from a lithium ion source such as a metal lithium or the like, by which a potential of the negative electrode is reduced to enhance an energy density. The negative electrode 15 has an electrode area larger than that of the positive electrodes 13 and 14, by which the deposition of the metal lithium on the negative electrode 15 is prevented.

In the specification of the present invention, the term "doping (dope)" involves "occlude", "carry", "absorb" or "insert", and specifically a phenomenon where lithium ions and/or anions enter the positive-electrode active material or the negative-electrode active material. The term "de-doping (de-dope)" involves "release" and "desorb", and specifically a phenomenon where lithium ions or anions desorb from the positive-electrode active material or the negative-electrode active material.

Figure 2:
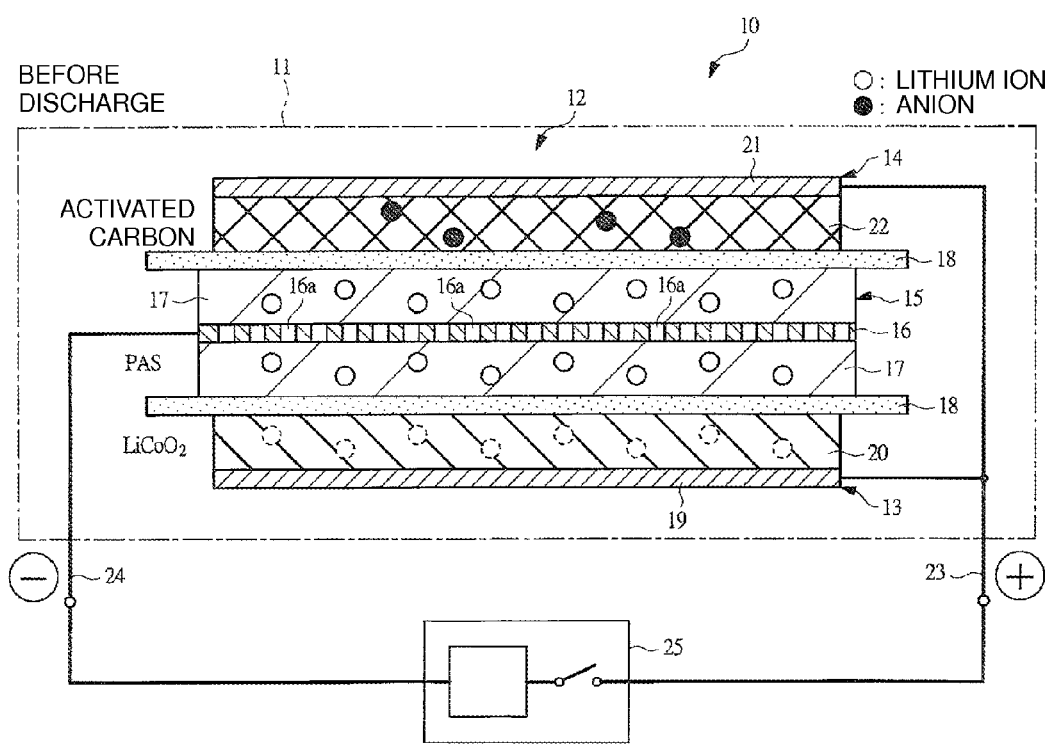
FIG. 2 is an explanatory view showing a discharge operation of the electric storage device.
Figure 3:
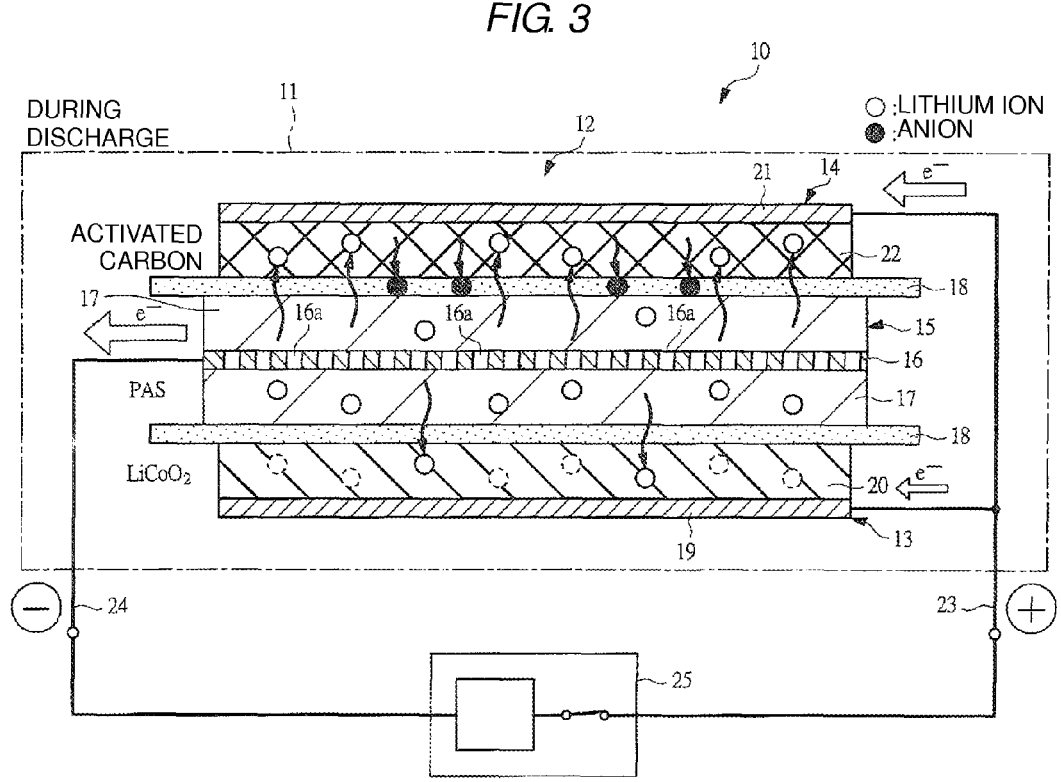
FIG. 3 is an explanatory view showing a discharge operation of the electric storage device.
Figure 4:
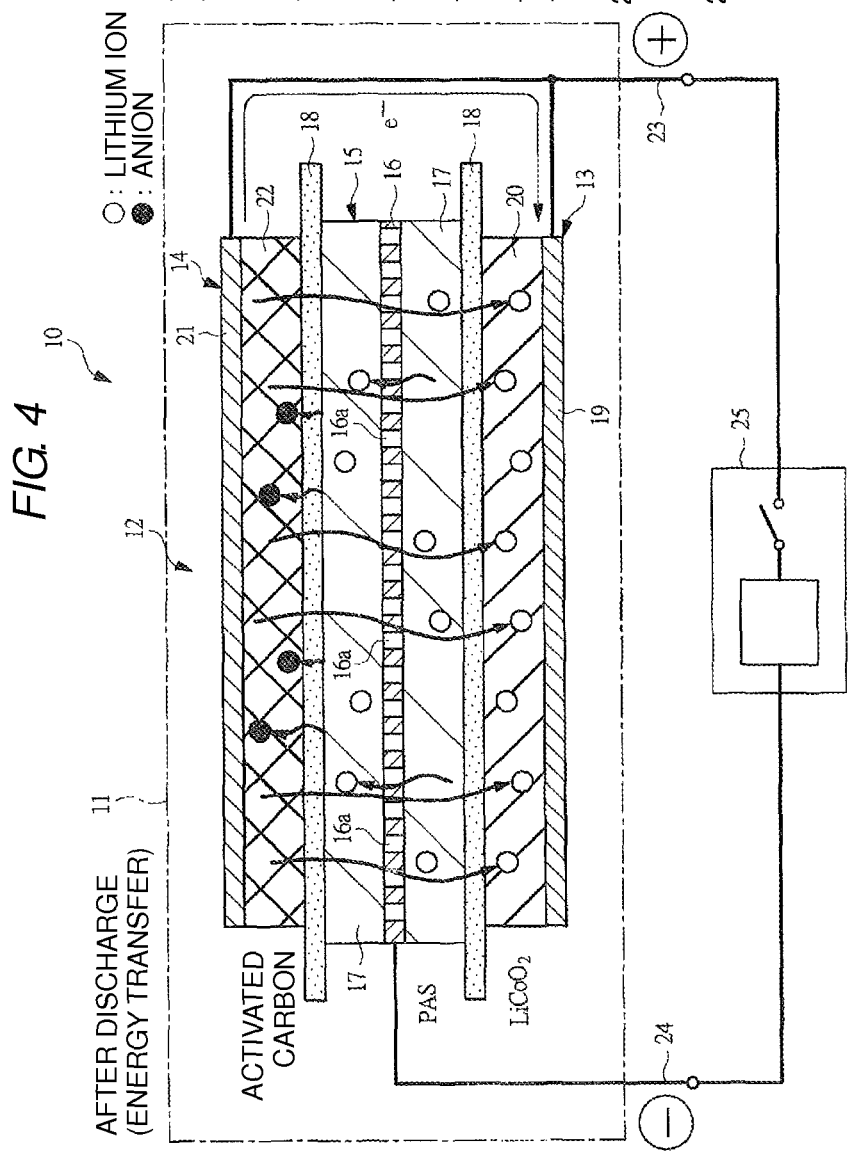
FIG. 4 is an explanatory view showing a discharge operation of the electric storage device.

Subsequently explained is a discharging operation of the electric storage device 10 having the above-described structure. FIGS. 2 to 4 are explanatory views showing the discharging operation of the electric storage device 10, wherein FIG. 2 shows the state before the discharge, FIG. 3 shows the state during the discharge, and FIG. 4 shows the state after the discharge. As shown in FIG. 2, in the charged electric storage device 10, lithium ions are doped into the PAS of the negative-electrode mixture layer 17. Further, lithium ions are de-doped from the lithium cobalt oxide of the positive-electrode mixture layer 20, and anions are doped into the activated carbon of the positive-electrode mixture layer 22.

Next, as shown in FIG. 3, in the electric storage device 10 during the discharging operation, the lithium ions are de-doped from the PAS of the negative-electrode mixture layer 17, while the lithium ions are doped into the lithium cobalt oxide of the positive-electrode mixture layer 20. Further, the anions are de-doped from the activated carbon of the positive-electrode mixture layer 22, and the lithium ions are doped into the activated carbon. Since the activated carbon has a charging/discharging characteristic with higher output than the lithium cobalt oxide, electrons are easy to transfer with respect to the positive-electrode mixture layer 22 than the positive-electrode mixture layer 20. Therefore, great current flows more from the positive-electrode mixture layer 22 than from the positive-electrode mixture layer 20 at the initial stage of the discharge.

Then, as shown in FIG. 4, in the electric storage device 10 after the discharge, the positive-electrode mixture layer 20 and the positive-electrode mixture layer 22 are electrically connected, and a large number of through-holes 16a are formed on the negative-electrode current collector 16 arranged between the positive-electrode mixture layer 20 and the positive-electrode mixture layer 22. Therefore, the lithium ions (ions) are transferred from the positive-electrode mixture layer 22 to the positive-electrode mixture layer 20, and the anions are doped into the positive-electrode mixture layer 22. Specifically, the lithium ions are transferred from the positive-electrode mixture layer 20 to the positive-electrode mixture layer 22 until the potential reaches the equilibrium potential of the positive-electrode mixture layer 20 and the positive-electrode mixture layer 22, with the result that energy transfers from the positive-electrode mixture layer 20 to the positive-electrode mixture layer 22. Although FIG. 4 shows the electric storage device 10 after the discharge, it is needless to say that the energy is transferred between the positive-electrode mixture layer 20 and the positive-electrode mixture layer 22 even during the discharging operation.

Figure 5:
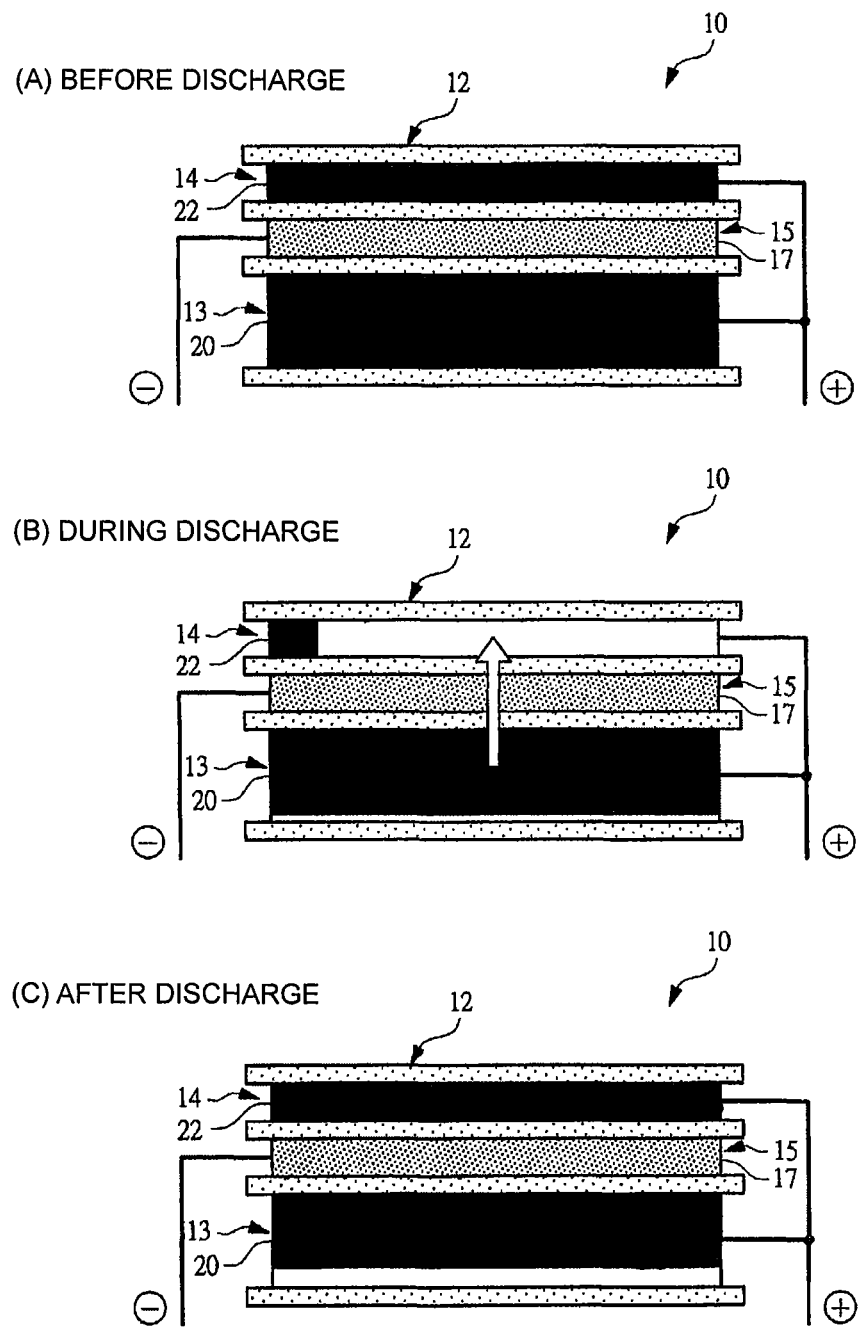
FIGS. 5A to 5C are image showing a transfer state of energy in the electric storage device.

FIGS. 5A to 5C are images showing the energy transfer condition in the electric storage device 10. In FIGS. 5A to 5C, the change in the potential is illustrated in the lateral direction, while the change in the capacitance is illustrated in the longitudinal direction. Firstly, as shown in FIGS. 5A and 5B, energy is discharged with high output from the activated carbon of the positive-electrode mixture layer 22, while energy is discharged with low output from the lithium cobalt oxide of the positive-electrode mixture layer 20, during the discharging operation of the electric storage device 10. Then, as shown in FIGS. 5B and 5C, after the energy is discharged from the activated carbon of the positive-electrode mixture layer 22, the energy is transferred from the positive-electrode mixture layer 20 to the positive-electrode mixture layer 22 through the negative-electrode mixture layer 17, whereby the energy is accumulated in the activated carbon of the positive-electrode mixture layer 22. Specifically, the discharge capacitance of the consumed activated carbon can be recovered until the discharge capacitance of the lithium cobalt oxide is reduced, so that the illustrated electric storage device 10 can have both of the high output density and the high energy density.

Figure 6:
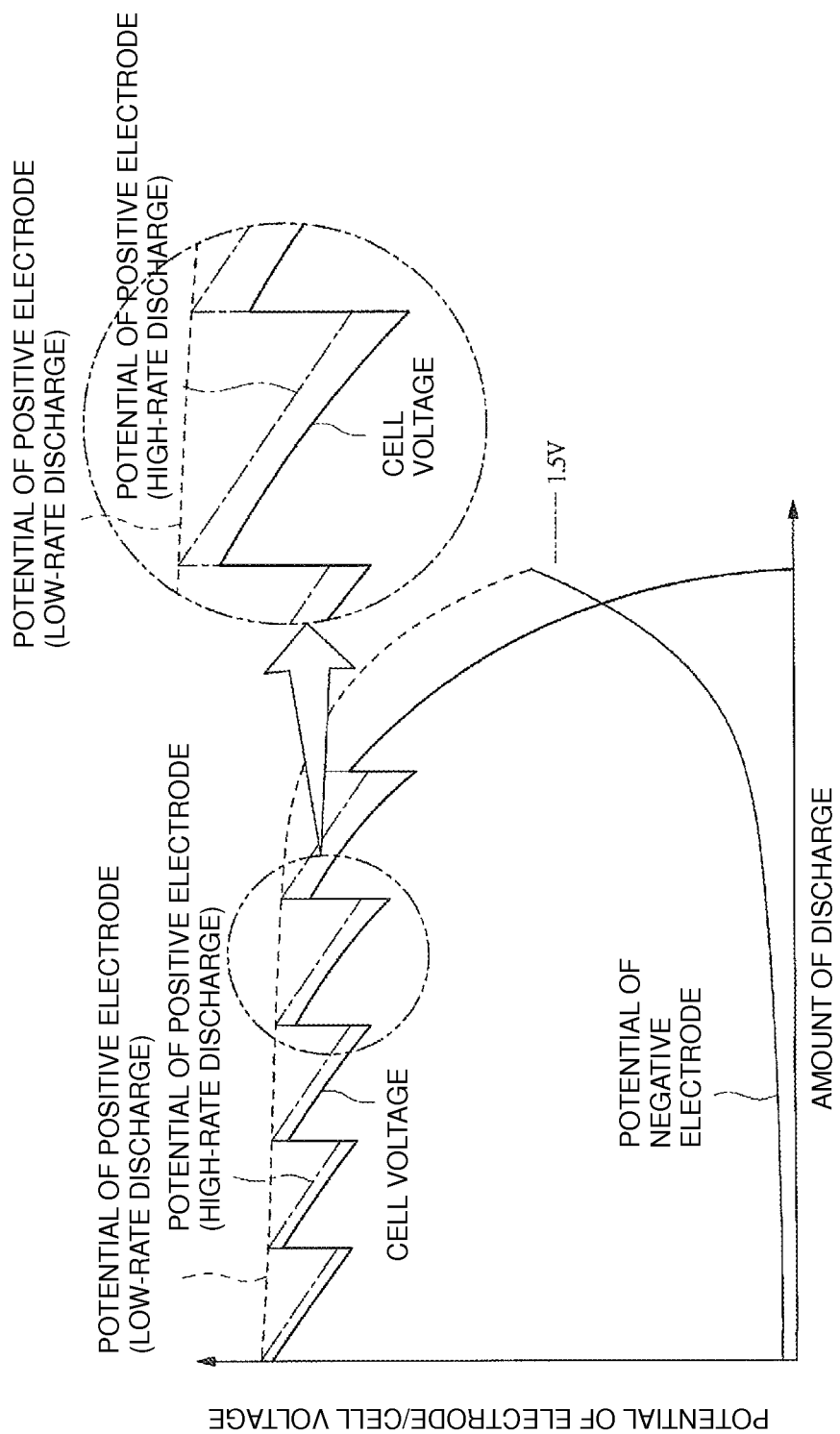
FIG. 6 is a chart schematically showing a discharge characteristic of the electric storage device.

FIG. 6 is a chart schematically showing the discharge characteristic of the electric storage device 10. As shown in FIG. 6, even when a large current discharge (high-rate discharge) is performed by utilizing the high output characteristic of the activated carbon in the positive-electrode mixture layer 22, the lithium ions can be transferred from the activated carbon of the positive-electrode mixture layer 22 to the lithium cobalt oxide of the positive-electrode mixture layer 20, since the through-holes 16a are formed on the negative-electrode current collector 16. Therefore, the potential (discharge capacitance) of the positive-electrode mixture layer 22 temporarily reduced can be recovered. Thus, the internal resistance can be reduced even if the discharge depth is increased. Therefore, the high output can be achieved with the high energy density of the electric storage device 10 secured. It is to be noted that, as shown in FIG. 6, the amount of the active material is set such that the potential of the positive electrode becomes not less than 1.5 V (vs. Li/Li$^+$), even if a small current discharge (low-rate discharge) is performed until the cell voltage becomes 0 V, whereby the deterioration of the positive electrodes 13 and 14 can be prevented.

As explained above, the electric storage device 10 according to one embodiment of the present invention includes the positive-electrode mixture layer 20 and the positive-electrode mixture layer 22, each having a different charging/discharging characteristic, i.e., each being of different types, wherein the positive-electrode mixture layer 20 and the positive-electrode mixture layer 22 are connected to each other, and the through-holes 16a are formed on the negative-electrode current collector 16 arranged between the positive-electrode mixture layer 20 and the positive-electrode mixture layer 22. With this structure, even when the difference in potential occurs between the positive-electrode mixture layer 20 and the positive-electrode mixture layer 22 due to the difference in the charging/discharging characteristic, the lithium ions can be transferred between the positive-electrode mixture layer 20 and the positive-electrode mixture layer 22, whereby the difference in the potential between the positive-electrode mixture layer 20 and the positive-electrode mixture layer 22 can be canceled. Accordingly, the charging/discharging characteristic of the positive-electrode mixture layer 20 and the charging/discharging characteristic of the positive-electrode mixture layer 22 can be combined to be utilized without applying a great load to the positive-electrode mixture layer 20 and the positive-electrode mixture layer 22. Consequently, the output density and the energy density of the electric storage device 10 can be enhanced, while securing the durability of the electric storage device 10. Further, the positive-electrode mixture layer 20 and the positive-electrode mixture layer 22 of different types are not in direct contact with each other. Therefore, even when the lithium cobalt oxide is deteriorated, for example, this deterioration does not affect the activated carbon, with the result that the durability of the electric storage device 10 can be enhanced.

Figure 7:
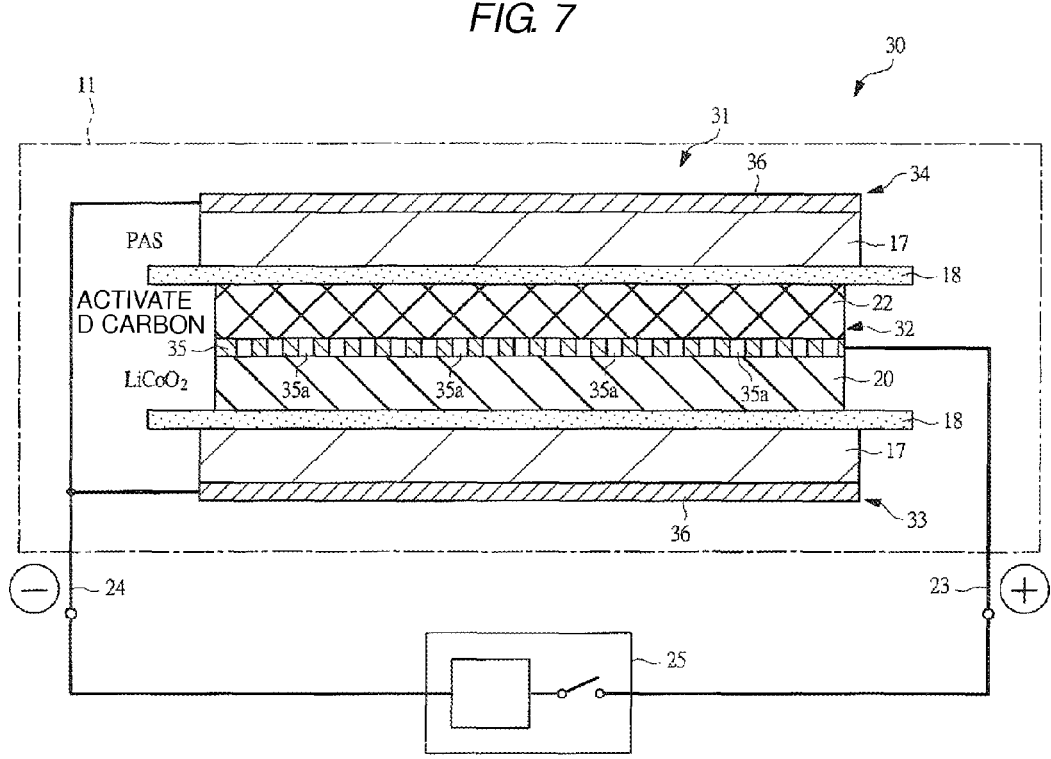
FIG. 7 is a sectional view schematically showing an internal structure of an electric storage device according to another embodiment of the present invention.

Next, another embodiment of the present invention will be explained. FIG. 7 is a sectional view schematically showing the internal structure of an electric storage device 30 according to another embodiment of the present invention. The components same as those shown in FIG. 1 are identified by the same numerals, and the explanation thereof are omitted. As shown in FIG. 7, an electrode laminate unit 31 is arranged at the inside of a laminate film 11 constituting an outer casing of the electric storage device 30. This electrode laminate unit 31 includes a positive electrode system having one positive electrode 32 and a negative electrode system having two negative electrodes 33 and 34.

The positive electrode 32 arranged at the center of the electrode laminate unit 31 has a positive-electrode current collector (current collector) 35 provided with a large number of through-holes 35a, a first positive-electrode mixture layer 20 coated on one surface of the positive-electrode current collector 35 and a second positive-electrode mixture layer 22 coated on the other surface of the positive-electrode current collector 35. A first negative electrode 33 and a second negative electrode 34 are arranged with separators 18 therebetween so as to sandwich the positive electrode 32. Each of the negative electrodes 33 and 34 includes a negative-electrode current collector (current collector) 36 and a negative-electrode mixture layer 17. Like the electric storage device 10 described above, the positive-electrode mixture layer 20 of the positive electrode 32 contains a lithium cobalt oxide as a positive-electrode active material, the positive-electrode mixture layer 22 of the positive electrode 32 contains an activated carbon as the positive-electrode active material, and the negative-electrode mixture layers 17 of the negative electrodes 33 and 34 contain a PAS as a negative-electrode active material. A positive electrode terminal 23 is connected to the positive-electrode current collector 35 that connects the first positive-electrode mixture layer 20 and the second positive-electrode mixture layer 22, while a negative electrode terminal 24 is connected to the pair of negative-electrode current collectors 36 that are connected to each other. Specifically, in the illustrated electric storage device 30, an electric storage component including the positive-electrode mixture layer 20 and the negative-electrode mixture layer 17 opposite to the positive-electrode mixture layer 20 and an electric storage component including the positive-electrode mixture layer 22 and the negative-electrode mixture layer 17 opposite to the positive-electrode mixture layer 22 are connected in parallel.

As described above, the positive-electrode mixture layer 20 and the positive-electrode mixture layer 22 of different types are electrically connected, and the large number of through-holes 35a are formed on the positive-electrode current collector 35 arranged between the positive-electrode mixture layer 20 and the positive-electrode mixture layer 22, whereby the lithium ions can be transferred between the positive-electrode mixture layer 20 and the positive-electrode mixture layer 22, like the above-described electric storage device 10. Consequently, the output density and the energy density of the electric storage device 30 can be enhanced, while securing the durability of the electric storage device 30. Further, the positive-electrode mixture layer 20 and the positive-electrode mixture layer 22 are arranged to be adjacent to each other through the positive-electrode current collector 35. Therefore, the lithium ions can be transferred quickly, with the result that the discharge capacitance of the activated carbon can quickly be recovered.

Figure 8:
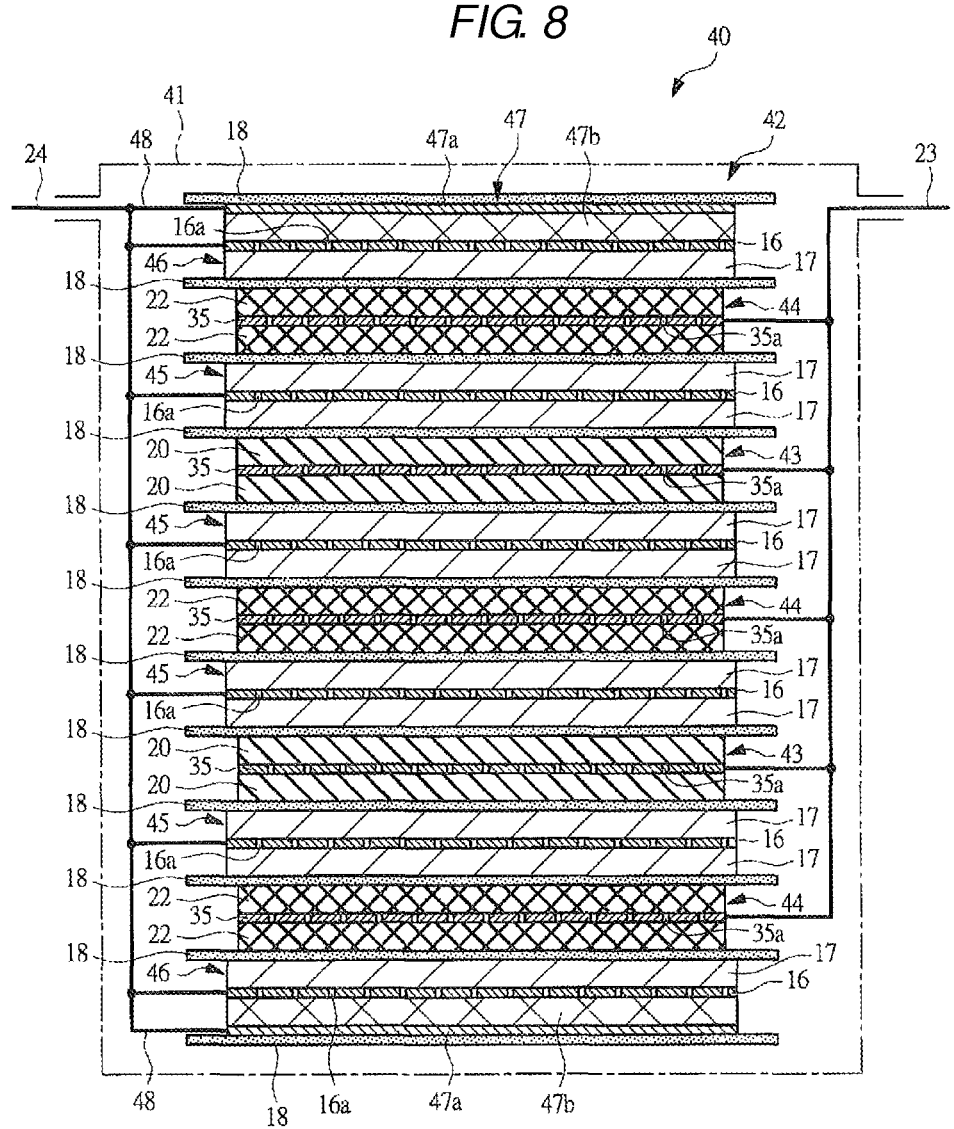
FIG. 8 is a sectional view schematically showing an internal structure of an electric storage device of a laminate type according to another embodiment of the present invention.

Next, another embodiment of the present invention will be explained. FIG. 8 is a sectional view schematically showing the internal structure of an electric storage device 40 of a laminate type according to another embodiment of the present invention. The components same as those shown in FIG. 1 and FIG. 7 are identified by the same numerals, and the explanation thereof are omitted.

As shown in FIG. 8, an electrode laminate unit 41 is arranged at the inside of a laminate film 41 constituting an outer casing of the electric storage device 40. This electrode laminate unit 41 includes a positive electrode system having five positive electrodes 43 and 44 and a negative electrode system having six negative electrodes 45 and 46. The positive electrode system has first positive electrodes 43 including a positive-electrode current collector (current collector) 35 provided with a large number of through-holes 35a, and first positive-electrode mixture layers 20 coated on both surfaces of the positive-electrode current collector 35, and second positive electrodes 44 including a positive-electrode current collector 35 provided with a large number of through-holes 35a, and second positive-electrode mixture layers 22 coated on both surfaces of the positive-electrode current collector 35. The negative electrode system has first negative electrodes 45 including a negative-electrode current collector 16 provided with a large number of through-holes 16a, and negative-electrode mixture layers 17 coated on both surfaces of the negative-electrode current collector 16, and negative electrodes 46 including a negative-electrode current collector 16 provided with a large number of through-holes 16a, and a negative-electrode mixture layer 17 coated on one surface of the negative-electrode current collector 16.

These positive electrodes 43 and 44 and the negative electrodes 45 and 46 are alternately laminated with the separators 18 arranged therebetween. Specifically, the electric storage device 40 has a device structure of a laminated type. Like the electric storage device 10 described above, the positive-electrode mixture layers 20 contain a lithium cobalt oxide as a positive-electrode active material, the positive-electrode mixture layers 22 contain an activated carbon as the positive-electrode active material, and the negative-electrode mixture layers 17 contain a PAS as a negative-electrode active material. A positive electrode terminal 23 is connected to the plural positive-electrode current collectors 35 that are connected to each other, while a negative electrode terminal 24 is connected to the plural negative-electrode current collectors 16 that are connected to each other.

A lithium ion source 47 is provided at the outermost part of the electrode laminate unit 42 so as to be opposite to the negative electrode 46. The lithium ion source 47 includes a lithium-electrode current collector 47a made of a conductive porous body such as a stainless mesh, and a metal lithium 47b adhered onto the lithium-electrode current collector 47a. The negative-electrode current collector 16 and the lithium-electrode current collector 47a are short-circuited via a lead wire 48, whereby the lithium ions are released from the metal lithium 47b and can be doped into the negative-electrode mixture layer 17 by injecting an electrolyte into the laminate film 11. By doping the lithium ions into the negative-electrode mixture layer 17, the potential of the negative electrode can be reduced to thereby increase the capacitance of the electric storage device 10.

A large number of through-holes 16a and 35a are formed on the negative-electrode current collector 16 and the positive-electrode current collector 35. The lithium ions can freely transfer between the electrodes via the through-holes 16a and 35a, whereby the lithium ions can be doped all over the laminated all negative-electrode mixture layers 17. The metal lithium 47b decreases as releasing the lithium ions, and finally, the entire amount is doped into the negative-electrode mixture layers 17, but a larger amount of the metal lithium 47b may be arranged, and some of the metal lithium 47b may be left in the electric storage device 40. Instead of the metal lithium 47b, an alloy that can supply lithium ions, such as a lithium-aluminum alloy, may be used. Further, the lithium ion source 47 and the positive electrodes 43 and 44 may be short-circuited so as to dope the lithium ions into the positive electrodes 43 and 44.

As described above, the positive-electrode mixture layer 20 and the positive-electrode mixture layer 22 of different types are electrically connected, and the large number of through-holes 16a and 35a are formed on the negative-electrode current collector 16 and the positive-electrode current collector 35 arranged between the positive-electrode mixture layer 20 and the positive-electrode mixture layer 22, whereby the lithium ions can be transferred between the positive-electrode mixture layer 20 and the positive-electrode mixture layer 22, like the above-described electric storage device 10. Consequently, the output density and the energy density of the electric storage device 40 can be enhanced, while securing the durability of the electric storage device 40. Further, the device structure of the laminated type is employed, so that the electrodes can be formed to be thin while keeping the discharge capacitance. Therefore, the output density of the electric storage device 40 can remarkably be enhanced.

Figure 9:
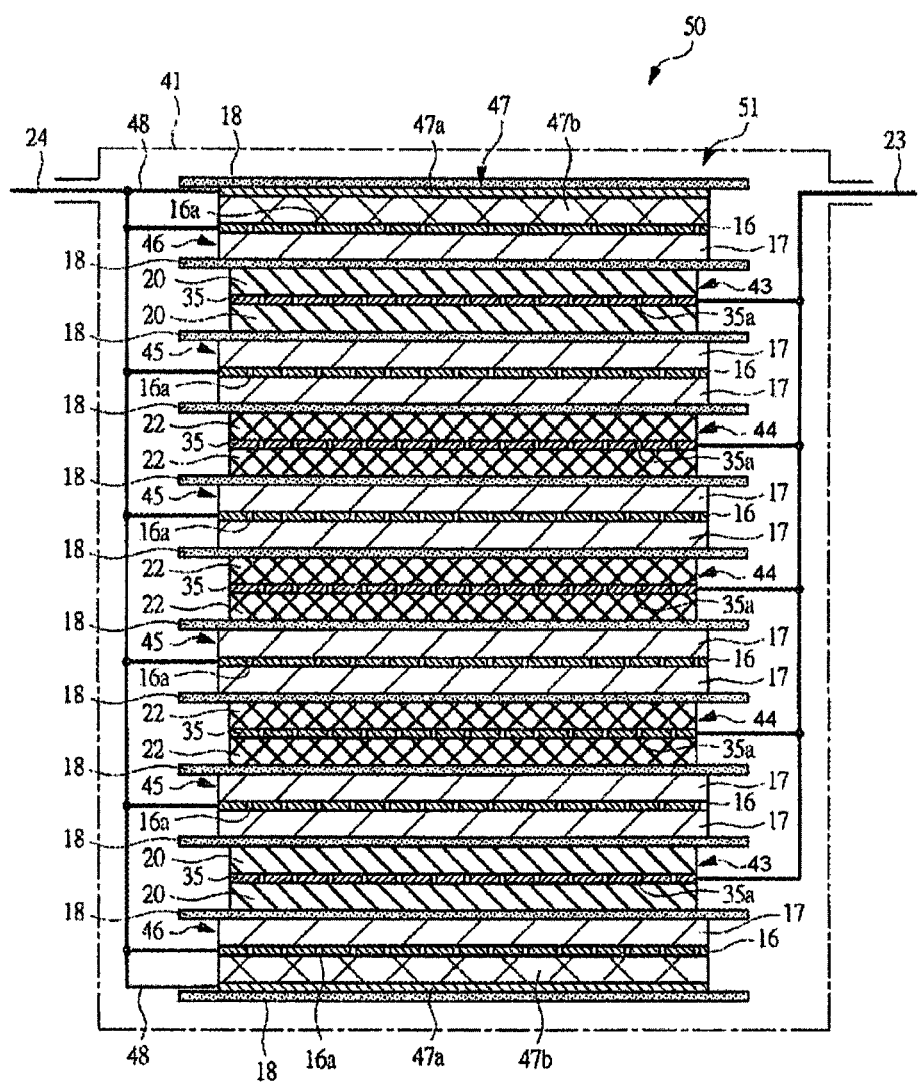
FIG. 9 is a sectional view schematically showing an internal structure of an electric storage device of a laminate type according to another embodiment of the present invention.

As described above, in the electric storage device 40 shown in FIG. 8, the positive electrode system is composed by alternately laminating the positive electrodes 43 containing the lithium cobalt oxide and the positive electrodes 44 containing the activated carbon. However, the invention is not limited thereto. The positive electrode system may be composed by laminating all together one of the positive electrodes 43 and 44. FIG. 9 is a sectional view schematically showing the internal structure of an electric storage device 50 of a laminate type according to another embodiment of the present invention. The components same as those shown in FIG. 8 are identified by the same numerals, and the explanation thereof are omitted.

As shown in FIG. 9, an electrode laminate unit 51 is arranged at the inside of a laminate film 41 of the electric storage device 50. The electrode laminate unit 51 includes a positive electrode system including five positive electrodes 43 and 44 and a negative electrode system including six negative electrodes 45 and 46. A positive electrode 43 containing a lithium cobalt oxide as a positive-electrode active material is arranged at the outermost part of the positive electrode system, and the positive electrode 44 containing an activated carbon as the positive-electrode active material is arranged at the central part of the positive electrode system. The positive electrode 43 containing the lithium cobalt oxide is arranged at the outermost part for enhancing the cooling effect of the positive electrode 43. Therefore, even if the internal short-circuit is caused due to a crush to the positive electrode 43, a thermal runaway of the electric storage device 50 can be forestalled to thereby enhance safety of the electric storage device 50.

Figure 10:
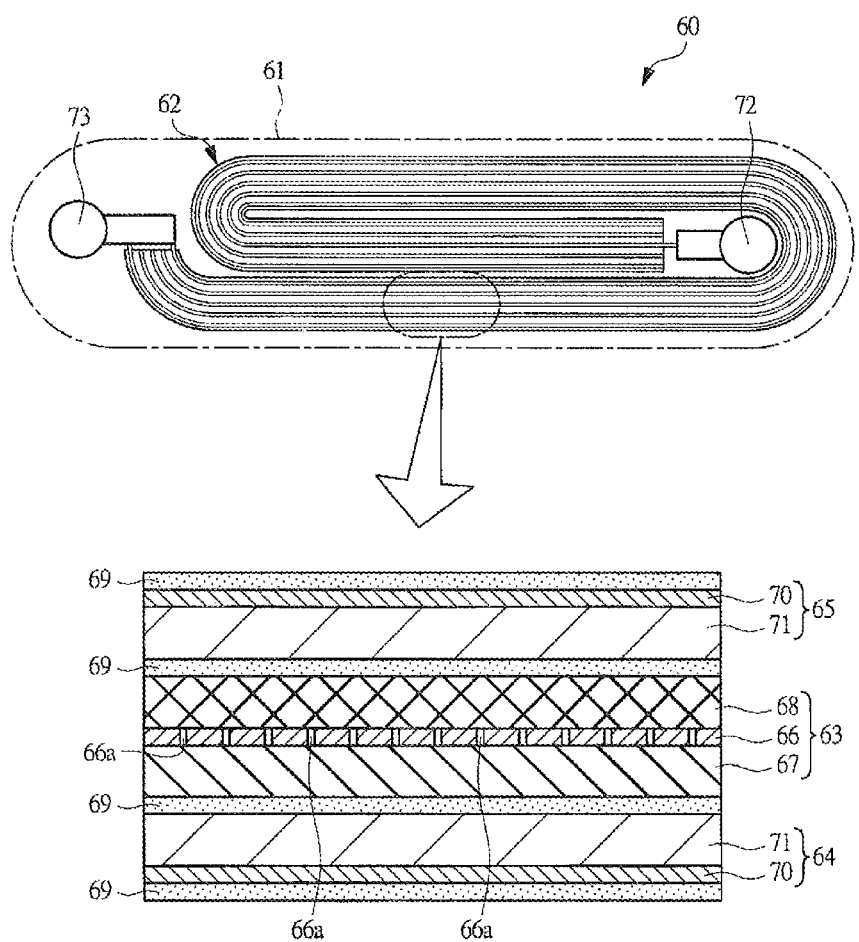
FIG. 10 is a sectional view schematically showing an internal structure of an electric storage device of a wound type according to another embodiment of the present invention.

Next, another embodiment of the present invention will be explained. FIG. 10 is a sectional view schematically showing the internal structure of an electric storage device 60 of a wound type according to another embodiment of the present invention. As shown in FIG. 10, an electrode laminate unit 62 is arranged at the inside of a metal can 61 constituting an outer casing of the electric storage device 60. This electrode laminate unit 62 includes a positive electrode system having one positive electrode 63 and a negative electrode system having two negative electrodes 64 and 65. The positive electrode 63 includes a positive-electrode current collector (current collector) 66 provided with a large number of through-holes 66a, a first positive-electrode mixture layer 67 coated on one surface of the positive-electrode current collector 66, and a second positive-electrode mixture layer 68 coated on the other surface of the positive-electrode current collector 66. The first negative electrode 64 and the second negative electrode 65 are arranged through a separator 69 so as to sandwich the positive electrode 63. Each of the negative electrodes 64 and 65 has a negative-electrode current collector (current collector) 70 and a negative-electrode mixture layer 71. Like the electric storage device 10 described above, the positive-electrode mixture layer 67 of the positive electrode 63 contains a lithium cobalt oxide as the positive-electrode active material, the positive-electrode mixture layer 68 of the positive electrode 63 contains the activated carbon as the positive-electrode active material, and the negative-electrode mixture layer 71 of the negative electrodes 64 and 65 contain a PAS as a negative-electrode active material. Further, positive electrode terminal 72 is connected to the positive-electrode current collector 66 that connects the first positive-electrode mixture layer 67 and the second positive-electrode mixture layer 68, while a negative electrode terminal 73 is connected to the pair of negative-electrode current collectors 70 that are connected to each other.

As described above, the positive-electrode mixture layer 67 and the positive-electrode mixture layer 68 of different types are electrically connected, and the large number of through-holes 66a are formed on the positive-electrode current collector 66 arranged between the positive-electrode mixture layer 67 and the positive-electrode mixture layer 68, whereby the lithium ions can be transferred between the positive-electrode mixture layer 67 and the positive-electrode mixture layer 68, like the above-described electric storage device 10. Consequently, the output density and the energy density of the electric storage device 60 can be enhanced, while securing the durability of the electric storage device 60. Further, the positive-electrode mixture layer 67 and the positive-electrode mixture layer 68 are arranged to be adjacent to each other through the positive-electrode current collector 66. Therefore, the lithium ions can be transferred quickly, with the result that the discharge capacitance of the activated carbon can quickly be recovered. Further, the device structure of the wound type is employed, with the result that the electrodes can be formed to be thin, while keeping the discharge capacitance. Consequently, the output density of the electric storage device 60 can remarkably be enhanced.

The components of each of the above-described electric storage devices 10, 30, 40, 50 and 60 will be explained in detail in the order described below: [A] negative electrode, [B] positive electrode, [C] negative-electrode current collector and positive-electrode current collector, [D] separator, [E] electrolyte, [F] outer casing.

[A] Negative Electrode

The negative electrode has the negative-electrode current collector and the negative-electrode mixture layer formed integral with the negative-electrode current collector, wherein the negative-electrode active material is contained in the negative-electrode mixture layer. The negative-electrode active material is not particularly limited, so long as it allows ions to be reversibly doped thereinto and de-doped therefrom. Examples of the negative-electrode active material include graphite, various carbon materials, polyacene-based material, tin oxide, silicon oxide. The graphite and hard carbon material (non-graphitizable carbon) are preferable as the negative-electrode active material, since they can increase the capacitance. Further, a polyacene-based organic semiconductor (PAS) that is a heat-treated material of an aromatic condensation polymer and has a polyacene skeletal structure in which a ratio of a number of hydrogen atoms to a number of carbon atoms is 0.05 or more and 0.50 or less is preferable for a negative-electrode active material, since it can increase the capacitance. It is preferable that the H/C of the PAS is within the range of not less than 0.05 and not more than 0.50. When the H/C of the PAS exceeds 0.50, the aromatic polycyclic structure is not sufficiently grown, so that the lithium ions cannot smoothly be doped or de-doped. Therefore, the charging/discharging efficiency of the electric storage device 10 may be reduced. When the H/C of the PAS is less than 0.05, the capacitance of the electric storage device may be reduced.

The above-described negative-electrode active material such as PAS is formed into a powdery shape, a granular shape or short fibrous shape. This negative-electrode active material is mixed with a binder to form a slurry. The slurry containing the negative-electrode active material is coated on the negative-electrode current collector and the resultant is dried, whereby the negative-electrode mixture layer is formed on the negative-electrode current collector. Usable binders mixed with the negative-electrode active material include fluorine-containing resin such as polytetrafluoroethylene, or polyvinylidene fluoride, thermoplastic resin such as polypropylene, or polyethylene. The fluorine-based binder is preferably used. Examples of the fluorine-based binder include polyvinylidene fluoride, copolymer of vinylidene fluoride and trifluoroethylene, copolymer of ethylene and tetrafluoroethylene, copolymer of propylene and tetrafluoroethylene. A conductive material such as acetylene black, graphite, metal powder, etc. may appropriately be added to the negative-electrode mixture layer.

[B] Positive Electrode

The positive electrode has the positive-electrode current collector and the positive-electrode mixture layer formed integral with the positive-electrode current collector. The positive-electrode mixture layer contains the positive-electrode active material. The positive-electrode active material is not particularly limited, so long as it allows ions to be reversibly doped thereinto and de-doped therefrom. Examples of the positive-electrode active materials include activated carbon, transition metal oxide, conductive polymer, polyacene-based substance. The positive-electrode active material is appropriately selected from an activated carbon, a transition metal oxide, conductive polymer, polyacene-based substance, etc., so that the first positive-electrode mixture layer and the second positive-electrode mixture layer having different charging/discharging characteristic, i.e., of different types, are formed.

For example, a lithium cobalt oxide ($LiCoO_2$) is contained in the above-described first positive-electrode mixture layer as the positive-electrode active material. Examples of the other materials include a lithium-containing metal oxide represented by a chemical formula of $Li_xM_yO_z$ (x, y, z are positive numbers, M is a metal, or may be metals of two or more types), such as $Li_xCoO_2$, $Li_xNiO_2$, $Li_xMnO_2$, or $Li_xFeO_2$, or a transition metal oxide or a sulfide such as cobalt, manganese, vanadium, titanium, or nickel. In case of requiring a high voltage, a lithium-containing oxide having a potential of 4 V or more with respect to the metal lithium is preferably used. More preferable lithium-containing oxides include a lithium-containing cobalt oxide, lithium-containing nickel oxide, or lithium-containing cobalt—nickel compound oxide.

The activated carbon contained in the above-described second positive-electrode mixture layer as the positive-electrode active material is made of an activated carbon grain that is subject to an alkali activation treatment and has a specific surface area of not less than 600 $m^2/g$. A phenolic resin, petroleum pitch, petroleum coke, coconut husk, coal-derived coke, etc. are used as the raw material of the activated carbon, wherein it is preferable to use the phenolic resin or coal-derived coke, since they can increase the specific surface area. Preferable alkali activators used for the alkali activation treatment of the activated carbons include salts or hydroxides of a metal ion such as lithium, sodium, or potassium, wherein potassium hydroxide is more preferable. Examples of the methods of the alkali activation include the method in which a carbide and an activator are mixed, and then, the resultant is heated in an airflow of inert gas, the method in which an activator is carried on a raw material of an activated carbon beforehand, the resultant is heated, and then, a carbonizing process and activating process are performed, the method in which a carbide is activated with a gas activation by using water vapors, and then, the resultant is surface-treated with an alkali activator. The activated carbon to which the alkali activation treatment is performed is pulverized by means of a known pulverizer such as a ball mill. The grain size generally used within a wide range can be applied. For example, it is preferable that $D_{50}$ is 2 μm or more, more preferably 2 to 50 μm, and most preferably 2 to 20 μm. Further, the activated carbon preferably having an average pore diameter of 10 nm or less and a specific surface area of 600 to 3000 $m^2/g$ is preferable. More preferably, an activated carbon having a specific surface area of 800 $m^2/g$ or more, particularly 1300 to 2500 $m^2/g$ is preferable.

The positive-electrode active material described above such as the lithium cobalt oxide or activated carbon is formed into a powdery shape, granular shape, or short fibrous shape, and this positive-electrode active material is mixed with a binder to form a slurry. The slurry containing the positive-electrode active material is coated on the positive-electrode current collector and the resultant is dried, whereby the positive-electrode mixture layer is formed on the positive-electrode current collector. Usable binders mixed with the positive-electrode active material include rubber binder such as SBR, fluorine-containing resin such as polytetrafluoroethylene, or polyvinylidene fluoride, thermoplastic resin such as polypropylene, or polyethylene. A conductive material such as acetylene black, graphite, or metal powder, may appropriately be added to the positive-electrode mixture layer.

[C] Positive-Electrode Current Collector and Negative-Electrode Current Collector The positive-electrode current collector and the negative-electrode current collector preferably have through holes penetrating therethrough. Examples thereof include an expanded metal, punching metal, net, or foam. The shape and number of the through hole are not particularly limited, and they are appropriately set so long as they do not hinder the transfer of the lithium ions. Various materials generally proposed for an organic electrolyte battery can be employed as the material of the negative-electrode current collector and the positive-electrode current collector. For example, stainless steel, copper, nickel, etc. can be used as the material of the negative-electrode current collector, and aluminum, stainless steel, etc. can be used as the material of the positive-electrode current collector.

In the electric storage device 10 shown in FIG. 1, the positive-electrode current collectors 19 and 21 are not arranged between the positive-electrode mixture layer 20 and the positive-electrode mixture layer 22, so that the electric storage device 10 can be used without forming through-holes on the positive-electrode current collectors 19 and 21. In the electric storage device 30 shown in FIG. 7, the negative-electrode current collector 36 is not arranged between the positive-electrode mixture layer 20 and the positive-electrode mixture layer 22, so that the electric storage device 30 can be used without forming through-holes on the negative-electrode current collector 36.

[D] Separator

A porous member or the like having durability with respect to the electrolyte, positive-electrode active material, negative-electrode active material, or the like, having an open cell and having no electron conductivity can be used for the separator. Generally, a cloth, nonwoven fabric, or porous body made of glass fiber, polyethylene, polypropylene, etc. is used. The thickness of the separator is preferably thin in order to reduce the internal resistance of the battery, but it may appropriately be set considering the holding amount of the electrolyte, circulation property, strength, etc.

[E] Electrolyte

It is preferable that an aprotic organic solvent containing a lithium salt is used for the electrolyte from the viewpoint that an electrolysis does not occur even by a high voltage and lithium ions can stably be present. Examples of the aprotic organic solvent include ethylene carbonate, propylene carbonate, dimethyl carbonate, diethyl carbonate, γ-butylorac-tone, acetonitrile, dimethoxyethane, tetrahydrofuran, dioxolane, methylene chloride, sulfolane, wherein these material are used singly or mixed with one another. Examples of the lithium salt include $LiClO_4$, $LiAsF_6$, $LiBF_4$, $LiPF_6$, $LIN(C_2F_5SO_2)_2$. Further, the concentration of the electrolyte in the electrolyte solution is preferably set to at least 0.1 mol/l, and more preferably set within the range of 0.5 to 1.5 mol/l, in order to reduce the internal resistance due to the electrolyte solution. A gel electrolyte or solid electrolyte may be used.

[F] Outer Casing

Various materials generally used for a battery can be used for the outer casing. A metal material such as iron or aluminum may be used, and a film material or the like may be used. The shape of the outer casing is not particularly limited. The outer casing may be formed into a shape appropriately selected according to the purpose, such as a cylindrical shape, or rectangular shape. From the viewpoint of miniaturization or reduced weight of the electric storage device, it is preferable to use the film-type outer casing employing an aluminum laminate film. In general, a three-layered laminate film having a nylon film at the outer part, an aluminum foil at the middle part, and an adhesive layer such as a denatured polypropylene at the inner part is used. The laminate film is generally deep-drawn according to a size of an electrode inserted therein. An electrode laminate unit is placed in the deep-drawn laminate film, the electrolyte is injected, and then, the outer peripheral portion of the laminate film is sealed by a thermal welding.

The present invention will be explained in detail with reference to examples.

EXAMPLES

Example 1

Fabrication of Negative Electrode 1

A phenolic resin molding plate with a thickness of 0.5 mm was put into a Siliconit electric furnace and heat-treated under a nitrogen atmosphere at a rate of 50° C./hour till temperature reached 500° C., and further heat-treated at the rate of 10° C./hour till temperature reached 700° C., whereby a PAS plate was synthesized. The PAS plate thus obtained was pulverized with a disc mill to obtain PAS powders. The PAS powders had a H/C ratio of 0.17.

Then, 100 parts by weight of the above PAS powder and a solution formed by dissolving 10 parts by weight of polyvinylidene fluoride powder in 80 parts by weight of N-methyl pyrrolidone were sufficiently mixed to obtain a slurry 1 for the negative electrode. The slurry 1 for the negative electrode was coated uniformly over both surfaces of a copper expanded metal (manufactured by Nippon Metal Industry Co., Ltd.) having a thickness of 32 µm (porosity of 50%) by a die coater, and dried and pressed, whereby a negative electrode 1 with a thickness of 80 µm was produced.

Fabrication of Positive Electrode 1

92 parts by weight of commercially available $LiCoO_2$ powder, 4.5 parts by weight of graphite powder, and 3.5 parts by weight of polyvinylidene fluoride (PVdF) powder were mixed, and then, N-methylpyrrolidone was added thereto. The resultant was thoroughly stirred and defoamed, where by a slurry 1 for a positive electrode was obtained. Both surfaces of an aluminum expandable metal (manufactured by Nippon Metal Industry Co., Ltd.) having a thickness of 35 cm (porosity of 50%) was coated with a non-aqueous carbon conductive coating (EB-815, manufactured by Acheson (Japan) Limited) by a spraying method, and dried thereby to obtain a positive-electrode current collector having a conductive layer thereon. The total thickness (the sum of the current collector thickness and the conductive layer thickness) of the positive-electrode current collector was 52 µm, and most of the through-holes of the positive-electrode current collector were filled with the conductive coating. The slurry 1 for the positive electrode was uniformly applied over both surfaces of the positive-electrode current collector by means of a roll coater, and dried and pressed to produce a positive electrode 1 having a thickness of 170 µm.

Fabrication of Positive Electrode 2

A slurry 2 for a positive electrode was obtained by thoroughly mixing 85 parts by weight of commercially available activated carbon powder having the specific surface area of 2000 $m^2/g$, 5 parts by weight of acetylene black powder, 6 parts by weight of acrylic resin binder, 4 parts by weight of carboxymethyl cellulose, and 200 parts by weight of water. The obtained slurry 2 for a positive electrode was uniformly coated on both surfaces of the positive-electrode current collector by means of a roll coater, and dried and pressed to produce a positive electrode 2 having a thickness of 170 µm.

Fabrication of Electrode Laminate Unit 1

The negative electrode 1 was cut out into nine pieces, each having an area of 6.0 cm×7.5 cm (excluding the terminal welding parts), the positive electrode 1 was cut out into two pieces, each having an area of 5.8 cm×7.3 cm (excluding the terminal welding parts), and the positive electrode 2 was cut out into six pieces, each having an area of 5.8 cm×7.3 cm (excluding the terminal welding parts). The positive electrodes 1 and 2 and the negative electrode 1 were alternately laminated through a separator of a nonwoven fabric made of polyethylene with a thickness of 35 μm in a manner that the terminal welding parts of the positive-electrode current collectors and the negative-electrode current collectors were set in the opposite side. The negative electrode 1 was arranged at the outermost part of the electrode laminate unit 1, and the positive electrode 1 was arranged at the outermost part of the positive electrode system. Then, separators were arranged at the uppermost part and the lowermost part, and the four sides of the structure were fastened with a tape. The terminal welding parts (eight sheets) of the positive-electrode current collectors were ultrasonically welded to an aluminum positive electrode terminal (having a width of 50 mm, length of 50 mm, thickness of 0.2 mm), and the terminal welding parts (nine sheets) of the negative-electrode current collectors were ultrasonically welded to a copper negative electrode terminal (having a width of 50 mm, length of 50 mm, thickness of 0.2 mm), thereby to obtain an electrode laminate unit 1.

Fabrication of Cell 1

The lithium electrode (lithium ion source) was formed by pressing a metal lithium foil onto a stainless steel mesh with a thickness of 80 μm. A lithium electrode was located on the upper part of the electrode laminate unit such that it entirely faces the negative electrode 1, and another lithium electrode was located on the lower part thereof in the same manner, whereby a three-electrode laminate unit was fabricated. The terminal welding parts (two sheets) of the lithium-electrode current collector were resistance-welded to the negative electrode terminal welding parts.

The three-electrode laminate unit was placed in a laminate film deep-drawn by 3.5 mm, and the opening portion was covered with other laminate film and three sides were heat-sealed. Then, the unit was vacuum-impregnated with an electrolyte solution (solution formed by dissolving $LiPF_6$ at 1 mol/L into a solvent mixture containing ethylene carbonate, diethyl carbonate, and propylene carbonate at the weight ratio of 3:4:1). Then, the remaining one side of the unit was heat-sealed to assemble four hybrid cells 1 having the positive electrodes 1 containing a lithium cobalt oxide and the positive electrodes 2 containing an activated carbon, in which the positive-electrode current collectors and the negative-electrode current collectors (expanded metal) provided with through-holes were arranged between the positive-electrode mixture layers of the positive electrode 1 and the positive electrode 2. The metal lithium located in each hybrid cell 1 was equivalent to 380 mAh/g per the negative-electrode active material weight.

Initial Evaluation of Cell 1

The thus assembled cells were left to stand for 20 days, and one cell of the four hybrid cells was disassembled. It was confirmed that no metal lithium remained. From this fact, it was considered that the amount of lithium ion equivalent to 380 mAh/g per the negative-electrode active material weight was pre-doped.

Characteristic Evaluation of Cell 1

The hybrid cell 1 was charged by a constant current-constant voltage charging method for six hours, in which the cell was charged at a constant current of 100 mA till the cell voltage reached 4.0 V and then charged at a constant voltage of 4.0 V. Then, the cell was discharged at a constant current of 100 mA till the cell voltage reached 2.0 V. The cycle (100 mA discharge) of the charging operation to 4.0 V and the discharging operation to 2.0 V was repeated, and when the cycle was repeated 10 times, the capacitance and the energy density of the cell were evaluated. Subsequently, the cell was charged in a similar way, and was discharged at a constant current of 20 A till the cell voltage reached 2.0 V. The cycle (20 A discharge) of the charging operation to 4.0 V and the discharging operation to 2.0 V was repeated, and when the cycle was repeated 10 times, the capacitance and the energy density of the cell were evaluated. The results of the evaluation are shown in FIG. 11. Numerical data in FIG. 11 are the average values of three cells.

With the temperature of the hybrid cell 1 maintained to 50° C., the cycle (20 A discharge) of the charging operation to 4.0 V and the discharging operation to 2.0 V was repeated, and when the cycle was repeated 50 times, the capacitance of the cell was evaluated. The results of the evaluation are shown in FIG. 12. Numerical data in FIG. 12 are the average values of three cells.

Example 2

Fabrication of Positive Electrode 3

A slurry 1 for a positive electrode containing a lithium cobalt oxide was uniformly applied over one surface of the positive-electrode current collector, used in Example 1, by means of a roll coater, and dried. Then, a slurry 2 for a positive electrode containing an activated carbon was uniformly applied over the other surface of the positive-electrode current collector, having the positive-electrode slurry 1 applied, by means of a roll coater, and dried. The applied surfaces were pressed to produce a positive electrode 3 having a thickness of 170 μm. The weight ratio of the lithium cobalt oxide and the activated carbon used for the positive electrode 3 was 1:3.

Fabrication of Electrode Laminate Unit 2

The negative electrode 1 was cut out into nine pieces, each having an area of 6.0 cm×7.5 cm (excluding the terminal welding parts), and the positive electrode 3 was cut out into eight pieces, each having an area of 5.8 cm×7.3 cm (excluding the terminal welding parts). The electrode laminate unit 2 was fabricated in the same manner as in Example 1, except that the positive electrode 3 containing the lithium cobalt oxide was used on one surface of the positive-electrode current collector, and the positive electrode 3 containing the activated carbon was used on the other surface of the positive-electrode current collector.

Fabrication of Cell 2

Four hybrid cells 4 were assembled in the same manner as in Example 1 by using the electrode laminate unit 2. The metal lithium located in each hybrid cell 2 was equivalent to 380 mAh/g per the negative-electrode active material weight.

Initial Evaluation of Cell 2

The thus assembled cells 2 were left to stand for 20 days, and one cell of the four hybrid cells was disassembled. It was confirmed that no metal lithium remained. From this fact, it

17 was considered that the amount of lithium ion equivalent to 380 mAh/g per the negative-electrode active material weight was pre-doped.

Characteristic Evaluation of Cell 2

The hybrid cell 2 was charged by a constant current-constant voltage charging method for six hours, in which the cell was charged at a constant current of 100 mA till the cell voltage reached 4.0 V and then was charged at a constant voltage of 4.0 V. Then, the cell was discharged at a constant current of 100 mA till the cell voltage reached 2.0 V. The cycle (100 mA discharge) of the charging operation to 4.0 V and the discharging operation to 2.0 V was repeated, and when the cycle was repeated 10 times, the capacitance and the energy density of the cell were evaluated. Subsequently, the cell was charged in a similar way, and was discharged at a constant current of 20 A till the cell voltage reached 2.0 V. The cycle (20 A discharge) of the charging operation to 4.0 V and the discharging operation to 2.0 V was repeated, and when the cycle was repeated 10 times, the capacitance and the energy density of the cell were evaluated. The results of the evaluation are shown in FIG. 11. Numerical data in FIG. 11 are the average values of three cells.

Comparative Example 1

Fabrication of Electrode Laminate Unit 3

The negative electrode 1 was cut out into nine pieces, each having an area of 6.0 cm×7.5 cm (excluding the terminal welding parts), and the positive electrode 1 was cut out into eight pieces, each having an area of 5.8 cm×7.3 cm (excluding the terminal welding parts). The electrode laminate unit 3 was fabricated in the same manner as in Example 1, except that only the positive electrode 1 containing a lithium cobalt oxide was used, and the lithium electrode was not arranged in the cell.

Fabrication of Cell 3

The three-electrode laminate unit 3 having no lithium electrode was placed in a laminate film deep-drawn by 3.5 mm, and the opening portion was covered with other laminate film and three sides were heat-sealed. Then, the unit was vacuum-impregnated with the electrolyte solution same as that used in Example 1. Then, the remaining one side of the unit was heat-sealed to assemble three battery cells 3 including the positive electrode 1 containing a lithium cobalt oxide and the negative electrode 1 containing a PAS.

Characteristic Evaluation of Cell 3

The battery cell 3 was charged by a constant current-constant voltage charging method for six hours, in which the cell was charged at a constant current of 100 mA till the cell voltage reached 4.0 V and then was charged at a constant voltage of 4.0 V. Then, the cell was discharged at a constant current of 100 mA till the cell voltage reached 2.0 V. The cycle (100 mA discharge) of the charging operation to 4.0 V and the discharging operation to 2.0 V was repeated, and when the cycle was repeated 10 times, the capacitance and the energy density of the cell were evaluated. Subsequently, the cell was charged in a similar way, and was discharged at a constant current of 20 A till the cell voltage reached 2.0 V. The cycle (20 A discharge) of the charging operation to 4.0 V and the discharging operation to 2.0 V was repeated, and when the

18 cycle was repeated 10 times, the capacitance and the energy density of the cell were evaluated. The results of the evaluation are shown in FIG. 11. Numerical data in FIG. 11 are the average values of three cells.

Comparative Example 2

Fabrication of Electrode Laminate Unit 4

The negative electrode 1 was cut out into nine pieces, each having an area of 6.0 cm×7.5 cm (excluding the terminal welding parts), and the positive electrode 2 was cut out into eight pieces, each having an area of 5.8 cm×7.3 cm (excluding the terminal welding parts). The electrode laminate unit 4 was fabricated in the same manner as in Example 1, except that only the positive electrode 2 containing an activated carbon was used.

Fabrication of Cell 4

A three-electrode laminate unit was fabricated in the same manner as in Example 1, except that a lithium electrode, having a metal lithium in which the amount of lithium ion equivalent to 600 mAh/g per the negative-electrode active material weight was used. The three-electrode laminate unit was placed in a laminate film deep-drawn by 3.5 mm, and the opening portion was covered with other laminate film and three sides were heat-sealed. Then, the unit was vacuum-impregnated with the electrolyte solution same as that used in Example 1. Then, the remaining one side of the unit was heat-sealed to assemble four capacitor cells 4 including the positive electrode 2 containing an activated carbon and the negative electrode 1 containing a PAS.

Initial Evaluation of Cell 4

After the capacitor cells 4 were completed by injecting the electrolyte solution, the capacitor cells 4 were left to stand for 20 days, and one cell of four capacitor cells 4 was disassembled. It was confirmed that no metal lithium remained. From this fact, it was considered that the amount of lithium ion equivalent to 600 mAh/g per the negative-electrode active material weight was pre-doped.

Characteristic Evaluation of Cell 4

The capacitor cell 4 was charged by a constant current-constant voltage charging method for six hours, in which the cell was charged at a constant current of 100 mA till the cell voltage reached 4.0 V and then was charged at a constant voltage of 4.0 V. Then, the cell was discharged at a constant current of 100 mA till the cell voltage reached 2.0 V. The cycle (100 mA discharge) of the charging operation to 4.0 V and the discharging operation to 2.0 V was repeated, and when the cycle was repeated 10 times, the capacitance and the energy density of the cell were evaluated. Subsequently, the cell was charged in a similar way, and was discharged at a constant current of 20 A till the cell voltage reached 2.0 V. The cycle (20 A discharge) of the charging operation to 4.0 V and the discharging operation to 2.0 V was repeated, and when the cycle was repeated 10 times, the capacitance and the energy density of the cell were evaluated. The results of the evaluation are shown in FIG. 11. Numerical data in FIG. 11 are the average values of three cells.

Comparison of Example 1, Example 2, Comparative Example 1, and Comparative Example 2

The hybrid cells 1 and 2 according to Examples 1 and 2 include the positive electrode 1 having the lithium cobalt oxide, which has a great capacitance, as a positive-electrode active material, and the positive electrode 2 having the activated carbon, which is excellent in the output characteristic, as the positive-electrode active material. Therefore, it was confirmed from FIG. 11 that the hybrid cells 1 and 2 according to Examples 1 and 2 had a discharging characteristic in which an energy density was high and the discharging capacitance upon a large current discharge was high. On the other hand, the battery cell 3 according to Comparative Example 1 includes only the positive electrode 1 having the lithium cobalt oxide, which has a great capacitance, as a positive-electrode active material. Therefore, it was confirmed that the battery cell 3 had a discharging characteristic in which an energy density was high, but the discharging capacitance upon a large current discharge was low. It was considered that it was because the capacitance could not be extracted in a large current discharge, since the resistance of the lithium cobalt oxide serving as the positive-electrode active material was high. The capacitor cell 4 according to Comparative Example 2 includes only the positive electrode 2 having the activated carbon, which has a high output characteristic, as the positive-electrode active material. Therefore, it was confirmed that the capacitor cell 4 had a discharging characteristic in which an energy density was high upon the large current discharge, but the energy density was low. It was considered that it was because the energy density was reduced, since the capacitance of the activated carbon serving as the positive-electrode active material was low.

Comparative Example 3

Fabrication of Positive Electrode 4

The slurry 1 for the positive electrode and the slurry 2 for the positive electrode in Example 1 were mixed to produce a slurry 3 for a positive electrode in which the weight ratio of the lithium cobalt oxide and the activated carbon was 1:3. Then, the slurry 3 for the positive electrode was uniformly applied on both surfaces of the positive-electrode current collector used in Example 1 by means of a roll coater, and dried. The applied surfaces were pressed to produce a positive electrode 4 with a thickness of 170 µm.

Fabrication of Electrode Laminate Unit 5

The negative electrode 1 was cut out into nine pieces, each having an area of 6.0 cm×7.5 cm (excluding the terminal welding parts), and the positive electrode 4 was cut out into eight pieces, each having an area of 5.8 cm×7.3 cm (excluding the terminal welding parts). The electrode laminate unit 5 was fabricated in the same manner as in Example 1, except that the positive electrode 4 containing the lithium cobalt oxide and the activated carbon in a mixed state was used.

Fabrication of Cell 5

Four hybrid cells 5 were assembled in the same manner as in Example 1 by using the electrode laminate unit 5. The metal lithium located in each hybrid cell 5 was equivalent to 380 mAh/g per the negative-electrode active material weight.

Initial Evaluation of Cell 5

The thus assembled hybrid cells 5 were left to stand for 20 days, and one cell of the four hybrid cells 5 was disassembled. It was confirmed that no metal lithium remained. From this fact, it was considered that the amount of lithium ion equivalent to 380 mAh/g per the negative-electrode active material weight was pre-doped.

Characteristic Evaluation of Cell 5

The hybrid cell 5 was charged by a constant current-constant voltage charging method for six hours, in which the cell was charged at a constant current of 100 mA till the cell voltage reached 4.0 V and then was charged at a constant voltage of 4.0 V. Then, the cell was discharged at a constant current of 100 mA till the cell voltage reached 2.0 V. The cycle (100 mA discharge) of the charging operation to 4.0 V and the discharging operation to 2.0 V was repeated, and when the cycle was repeated 10 times, the capacitance and the energy density of the cell were evaluated. Subsequently, the cell was charged in a similar way, and was discharged at a constant current of 20 A till the cell voltage reached 2.0 V. The cycle (20 A discharge) of the charging operation to 4.0 V and the discharging operation to 2.0 V was repeated, and when the cycle was repeated 10 times, the capacitance and the energy density of the cell were evaluated. The results of the evaluation are shown in FIG. 11. Numerical data in FIG. 11 are the average values of three cells.

With the temperature of the hybrid cell 5 maintained to 50° C., the cycle (20 A discharge) of the charging operation to 4.0 V and the discharging operation to 2.0 V was repeated, and when the cycle was repeated 50 times, the capacitance of the cell was evaluated. The results of the evaluation are shown in FIG. 12. Numerical data in FIG. 12 are the average values of three cells.

Comparative Example 4

Fabrication of Positive Electrode 5

The slurry 1 for a positive electrode containing a lithium cobalt oxide was uniformly applied over both surfaces of the positive-electrode current collector, used in Example 1, and dried. Then, the slurry 2 for a positive electrode containing an activated carbon was uniformly applied over both surfaces of the positive-electrode current collector, having the positive-electrode slurry 1 applied, and dried. The applied surfaces were pressed to produce a positive electrode 5 having a thickness of 170 µm. The weight ratio of the lithium cobalt oxide and the activated carbon used for the positive electrode 3 was 1:3.

Fabrication of Electrode Laminate Unit 6

The negative electrode 1 was cut out into nine pieces, each having an area of 6.0 cm×7.5 cm (excluding the terminal welding parts), and the positive electrode 5 was cut out into eight pieces, each having an area of 5.8 cm×7.3 cm (excluding the terminal welding parts). The electrode laminate unit 6 was fabricated in the same manner as in Example 1, except that the positive electrode 5 having been applied thereon two layers of the lithium cobalt oxide and the activated carbon was used.

Fabrication of Cell 6

Four hybrid cells 6 were assembled in the same manner as in Example 1 by using the electrode laminate unit 6. The metal lithium located in each hybrid cell 6 was equivalent to 380 mAh/g per the negative-electrode active material weight.

Initial Evaluation of Cell 6

The thus assembled hybrid cells 6 were left to stand for 20 days, and one cell of the four hybrid cells 6 was disassembled.

It was confirmed that no metal lithium remained. From this fact, it was considered that the amount of lithium ion equivalent to 380 mAh/g per the negative-electrode active material weight was pre-doped.

Characteristic Evaluation of Cell 6

The hybrid cell 6 was charged by a constant current-constant voltage charging method for six hours, in which the cell was charged at a constant current of 100 mA till the cell voltage reached 4.0 V and then was charged at a constant voltage of 4.0 V. Then, the cell was discharged at a constant current of 100 mA till the cell voltage reached 2.0 V. The cycle (100 mA discharge) of the charging operation to 4.0 V and the discharging operation to 2.0 V was repeated, and when the cycle was repeated 10 times, the capacitance and the energy density of the cell were evaluated. Subsequently, the cell was charged in a similar way, and was discharged at a constant current of 20 A till the cell voltage reached 2.0 V. The cycle (20 A discharge) of the charging operation to 4.0 V and the discharging operation to 2.0 V was repeated, and when the cycle was repeated 10 times, the capacitance and the energy density of the cell were evaluated. The results of the evaluation are shown in FIG. 11. Numerical data in FIG. 11 are the average values of three cells.

With the temperature of the hybrid cell 6 maintained to 50° C., the cycle (20 A discharge) of the charging operation to 4.0 V and the discharging operation to 2.0 V was repeated, and when the cycle was repeated 50 times, the capacitance of the cell was evaluated. The results of the evaluation are shown in FIG. 12. Numerical data in FIG. 12 are the average values of three cells.

Comparison of Example 1, Comparative Example 3, and Comparative Example 4

It was confirmed from FIG. 11 that the hybrid cell 5 according to Comparative Example 3 had a high energy density, since it included the lithium cobalt oxide, which had a great capacitance, as a positive-electrode active material. However, it was confirmed that the cell capacitance upon the discharge of 20 A was lower than that of the hybrid cell 1 in Example 1. It is considered that it is because the resistance of the positive electrode 4 is increased, compared to the positive electrode containing only the activated carbon as the positive-electrode active material, so that the high output characteristic of the activated carbon is not sufficiently exhibited, since the hybrid cell 5 in Comparative Example 3 has a structure in which the lithium cobalt oxide and the activated carbon are mixed and applied. Further, it was confirmed from FIG. 12 that the cell capacitance was reduced also with respect to the cycle characteristic in the hybrid cell 5 in Comparative Example 3. This is considered that it is because the deterioration of the lithium cobalt oxide affects the activated carbon mixed therewith, so that the resistance of the positive electrode 4 is increased to thereby deteriorate the hybrid cell 5. On the other hand, Example 1 has a structure in which the lithium cobalt oxide is not in direct contact with the activated carbon. Therefore, even when the lithium cobalt oxide is deteriorated, and hence, the resistance of the positive electrode 1 is increased, the positive electrode 2 containing the activated carbon as the positive-electrode active material is not deteriorated, whereby a high output characteristic is maintained.

As shown in FIG. 11, it was similarly confirmed that the hybrid cell 6 in Comparative Example 4 had a high energy density, since it included, as the positive-electrode active material, the lithium cobalt oxide having a great capacitance. However, it was confirmed that the cell capacitance upon the discharge of 20 A was lower than that of the hybrid cell 1 in Example 1. It is considered that it is because the hybrid cell 6 in Comparative Example 4 has the structure in which the activated carbon was overlappingly applied on the lithium cobalt oxide, so that the resistance of the positive electrode 5 becomes higher than the positive electrode only containing the activated carbon as the positive-electrode active material, whereby the high output characteristic of the activated carbon is not sufficiently exhibited. Further, it was confirmed from FIG. 12 that the cell capacitance with respect to the cycle characteristic was reduced in the hybrid cell 6 in Comparative Example 4. It is considered that it is because the deterioration of the lithium cobalt oxide affects the activated carbon that is in intimate contact with the lithium cobalt oxide, so that the resistance of the positive electrode 5 is increased to thereby deteriorate the hybrid cell 6.

Example 3

Fabrication of Cell 7

Three hybrid cells 7 were fabricated in the same manner as in Example 1, except that the lithium electrode was not arranged.

Characteristic Evaluation of Cell 7

The hybrid cell 7 was charged by a constant current-constant voltage charging method for six hours, in which the cell was charged at a constant current of 100 mA till the cell voltage reached 4.0 V and then was charged at a constant voltage of 4.0 V. Then, the cell was discharged at a constant current of 100 mA till the cell voltage reached 2.0 V. The cycle (100 mA discharge) of the charging operation to 4.0 V and the discharging operation to 2.0 V was repeated, and when the cycle was repeated 10 times, the capacitance and the energy density of the cell were evaluated. Subsequently, the cell was charged in a similar way, and was discharged at a constant current of 20 A till the cell voltage reached 2.0 V. The cycle (20 A discharge) of the charging operation to 4.0 V and the discharging operation to 2.0 V was repeated, and when the cycle was repeated 10 times, the capacitance and the energy density of the cell were evaluated. The results of the evaluation are shown in FIG. 11. Numerical data in FIG. 11 are the average values of three cells.

With the temperature of the hybrid cell 7 maintained to 50° C., the cycle (20 A discharge) of the charging operation to 4.0 V and the discharging operation to 2.0 V was repeated, and when the cycle was repeated 50 times, the capacitance of the cell was evaluated. The results of the evaluation are shown in FIG. 12. Numerical data in FIG. 12 are the average values of three cells.

Comparison of Example 1 and Example 3

The hybrid cell 7 in Example 3 has the positive electrode 1 containing, as the positive-electrode active material, the lithium cobalt oxide having a great capacitance, and the positive electrode 2 containing, as the positive-electrode active material, the activated carbon that is excellent in the output characteristic. Therefore, it was confirmed from FIG. 11 that it had a discharging characteristic in which the energy density was high and the discharge capacitance with a high load was high. It is to be noted that it was confirmed the energy density was more increased if lithium ions were doped into the negative electrode 1 beforehand, like the hybrid cell 1 in Example 1. As shown in FIG. 12, in the hybrid cell 7 in Example 3, even when the lithium cobalt oxide is deteriorated to thereby increase the resistance of the positive electrode 1, the positive electrode 2 containing the activated carbon is not deteriorated. Therefore, it is considered that the high output characteristic is maintained even when the cycle is repeated.

Comparative Example 5

Fabrication of Cell 8

Four hybrid cells 8 were assembled in the same manner as in Example 1, except that an aluminum foil having no through-holes was used as a positive-electrode current collector, and a copper foil having no through-holes was used as a negative-electrode current collector.

Initial Evaluation of Cell 8

The thus assembled hybrid cells 8 were left to stand for 20 days, and one cell of the four hybrid cells 8 was disassembled. It was confirmed that almost all metal lithium remained. This is because the positive-electrode current collector and the negative-electrode current collector have no through-holes, so that the lithium ions cannot be transferred in the laminating direction, with the result that the lithium ions are only doped into the outermost negative electrode opposite to the lithium electrode.

Characteristic Evaluation of Cell 8

The hybrid cell 8 was by a constant current-constant voltage charging method for six hours, in which the cell was charged at a constant current of 100 mA till the cell voltage reached 4.0 V and then was charged at a constant voltage of 4.0 V. As a result, gas was produced, and the laminate film was expanded. Therefore, the test was ended.

In the hybrid cell 8, the lithium ions are doped only into the outermost negative electrode, so that the difference in potential is produced between the negative electrodes. Therefore, a variation is produced in the voltages of the opposite electrodes. Accordingly, it was considered that, when the cell was charged till the cell voltage reached 4.0 V, the potential of the outer negative electrode having the lithium ions doped therein was reduced near 0 V, but the potential of the inner negative electrode having no lithium ions doped therein was reduced to be about 2 V. Specifically, since the cell is charged till the cell voltage reaches 4.0 V, the potential of the positive electrode, which is arranged so as to be opposite to the inner negative electrode, becomes much greater than 4 V, whereby gas is produced with the decomposition of the electrolyte solution. If the through-holes are formed on the positive-electrode current collector and the negative-electrode current collector, the lithium ions can freely be transferred between the positive electrodes or between the negative electrodes, so that the variation in the cell voltage is canceled to prevent a local overcharging. Accordingly, in case where the through-holes are formed on the positive-electrode current collector and the negative-electrode current collector as shown in Examples 1 to 3, the potentials of all positive electrodes can be made equal and the potentials of all negative electrodes can be made equal, whereby a local overcharging is prevented, and gas is not produced.

In case where a cell in which the lithium ions are not doped before hand into the electrodes or a cell in which the lithium ions are uniformly doped before hand into the electrodes are used, the above-described constant current-constant voltage charging method is possible. However, in case where the positive-electrode current collector having no through-holes or the negative-electrode current collector having no through-holes is used as in Comparative Example 5, there arises a problem that the durability of the cell is deteriorated. Specifically, when the positive electrode 1 containing the lithium cobalt oxide and the positive electrode 2 containing the activated carbon are assembled, a difference in the potential between the positive electrode 1 and the positive electrode 2 is produced after the charging or discharging, due to the difference in the resistance between the positive electrode 1 and the positive electrode 2 or the difference in the discharge curve between both of them. However, since the current collector arranged between the positive electrode 1 and the positive electrode 2 has no through-holes, ions cannot be transferred between the positive electrode 1 and the positive electrode 2, so that the produced difference in potential cannot be canceled. As a result, there arises a problem that the positive electrodes 1 and 2 are deteriorated since unnecessary load is applied to the positive electrodes 1 and 2, or a problem that the usable range of the cell voltage needs to be narrowed in order to prevent the overcharging and overdischarging.

The present invention is not limited to the above-described embodiments, and various modifications are possible without departing from the scope of the present invention. For example, in the illustrated electric storage devices 10, 30, 40, 50, and 60, two positive-electrode mixture layers of different types (characteristics) 20, 22, 57, and 58 are connected to each other, and the through-holes 16a, 35a, and 56a are formed on the negative-electrode current collector 16 or the positive-electrode current collectors 35 and 56 arranged between the positive-electrode mixture layers 20, 22, 57 and 58. However, the invention is not limited thereto. Three or more positive-electrode mixture layers of different types are connected to one another, and the through-holes are formed on the negative-electrode current collector and the positive-electrode current collector arranged between these positive-electrode mixture layers.

The positive-electrode active material and the negative-electrode active material are not limited to the above-described active materials. Various active materials used for a conventional battery or a capacitor is applicable. Further, various electrolytes and separators used for a conventional battery or a capacitor can also be used for the electrolyte and the separator 18.

The electric storage device according to the present invention is greatly effective as a driving storage power source or an auxiliary storage power source for an electric vehicle, hybrid vehicle, or the like. Further, the electric storage device according to the present invention is well adaptable to a driving storage power source for an electric vehicle, motorized wheel chair, or the like, a storage power source used in a photovoltaic power generating device or a wind power generating device, or a storage power source used in a portable device or an electric appliance.

What is claimed is:
1. An electric storage device comprising:
a positive electrode system including
a first positive electrode including
a current collector and
a first positive-electrode mixture layer
a second positive electrode including
a current collector and
a second positive-electrode mixture layer, and a negative electrode system including
a negative electrode including
a current collector and
a negative-electrode mixture layer, wherein
the first positive electrode and the second positive electrode are arranged across the negative electrode,
the first positive-electrode mixture layer and the second positive-electrode mixture layer are connected to each other, and of different types, and
through-holes are formed in the current collector of the negative electrode arranged between the first positive-electrode mixture layer and the second positive-electrode mixture layer;
wherein the first positive-electrode mixture layer contains a lithium cobalt oxide, and the second positive-electrode mixture layer contains an activated carbon, and wherein the lithium cobalt oxide has a higher energy density than the activated carbon and the activated carbon has a higher output characteristic than the lithium cobalt oxide.

2. The electric storage device according to claim 1, wherein the first positive-electrode mixture layer and the second positive-electrode mixture layer are electrically connected, and ions are transferred between the first positive-electrode mixture layer and the second positive-electrode mixture layer via the through-holes.

3. The electric storage device according to claim 1, wherein the first positive-electrode mixture layer includes $LiCoO_2$ as the lithium cobalt oxide.

4. The electric storage device according to claim 1, wherein the negative electrode system includes
a first negative electrode and
a second negative electrode that are arranged across the positive electrode, and
the through-holes are formed in the current collector of the positive electrode having the first positive-electrode mixture layer on its one surface and the second positive-electrode mixture layer on its other surface.

5. The electric storage device according to claim 1, wherein the positive electrode system includes plural positive electrodes including the first positive electrode and the second positive electrode, and
the first positive electrode having the first positive-electrode mixture layer, among the plural positive electrodes, is arranged at the outermost part of the positive electrode system.

6. The electric storage device according to claim 1, comprising: a lithium ion source that is in contact with at least one of the negative electrode and the positive electrode, wherein lithium ions are doped from the lithium ion source into at least one of the negative electrode and the positive electrode.

7. The electric storage device according to claim 1, wherein the negative electrode has an electrode area greater than that of the positive electrode.

8. The electric storage device according to claim 1, having a device structure of a laminated type in which the positive electrode and the negative electrode are alternately laminated, or a device structure of a wound type in which the positive electrode and the negative electrode are wound in an overlapping manner.

9. The electric storage device according to claim 1, wherein the negative-electrode mixture layer contains a polyacene-based organic semiconductor, which is a heat-treated material of an aromatic condensation polymer and has a polyacene skeletal structure in which a ratio of a number of hydrogen atoms to a number of carbon atoms is 0.05 or more and 0.50 or less, a graphite, or non-graphitizable carbon.

* * * * *